(12) United States Patent
Nakajima et al.

(10) Patent No.: US 7,564,515 B2
(45) Date of Patent: Jul. 21, 2009

(54) ELECTRONIC APPARATUS

(75) Inventors: Yuji Nakajima, Tokyo (JP); Yasuyuki Horii, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 188 days.

(21) Appl. No.: 11/809,509

(22) Filed: Jun. 1, 2007

(65) Prior Publication Data

US 2007/0291447 A1    Dec. 20, 2007

(30) Foreign Application Priority Data

Jun. 8, 2006    (JP) .............................. 2006-160042

(51) Int. Cl.
*G02F 1/1333*    (2006.01)
(52) U.S. Cl. .......................... 349/58; 349/60
(58) Field of Classification Search .................. 349/58, 349/60, 65
See application file for complete search history.

(56) References Cited

FOREIGN PATENT DOCUMENTS

JP    09-062398    3/1997

*Primary Examiner*—David Nelms
*Assistant Examiner*—David Y Chung
(74) *Attorney, Agent, or Firm*—Blakely, Sokoloff, Taylor & Zafaman LLP

(57) ABSTRACT

According to one embodiment, An electronic apparatus includes a main body, a display unit and a hinge portion. The main body includes a first convex and a second convex disposed on an upper face of the main body. The display unit includes a leg portion having a projection. The hinge portion joints the main body and the display unit. The hinge portion includes a rotation shaft rotatably supporting the display unit between a closed state and an open state and a pivot shaft swingably supporting the display unit between an obverse state and a reverse state. The projection is engaged with the first convex when the display unit is in the obverse state, and engaged with the second convex when the display unit is in the reverse state.

11 Claims, 27 Drawing Sheets

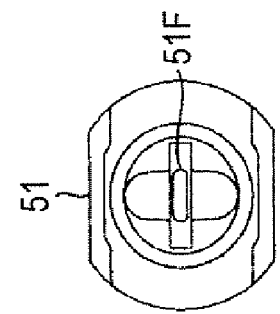
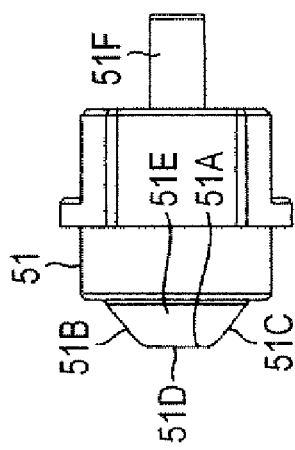
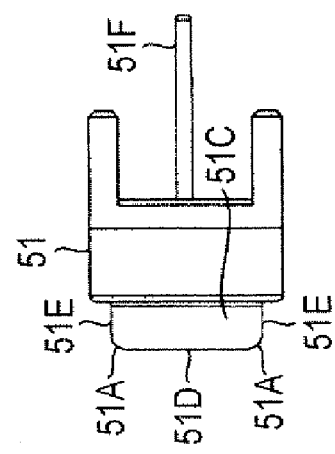
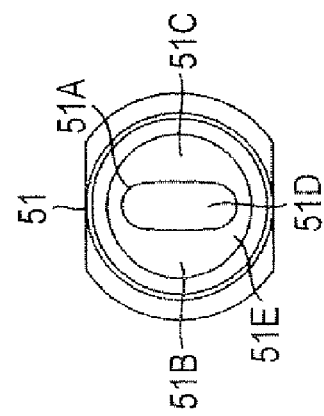

ELECTRONIC APPARATUS

CROSS-REFERENCE TO RELATED APPLICATIONS

This application is based upon and claims the benefit of priority from Japanese Patent Application No. 2006-160042, filed Jun. 8, 2006, the entire contents of which are incorporated herein by reference.

BACKGROUND

1. Field

An aspect of the present invention relates to an electronic apparatus including a hinge mechanism that enables a display section to rotate.

2. Description of the Related Art

For example, an electronic apparatus that enables the user to rotate a display section relative to a main body is available. This electronic apparatus includes a main body, a display section, a hinge mechanism provided between the main body and the display section, and a cable passing through the hinge mechanism so as to connect the main body and the display section. The hinge mechanism includes a first shaft that enables the display section to rotate in the opening/closing direction relative to the main body and a second shaft that enables the display section to pivot in the opening/closing direction in a horizontal direction relative to the main body. The hinge mechanism further includes a stopper that prevents the display section from an over-pivoting on the second shaft and a groove that the stopper engages.

For example, JP-A-9-62398 discloses the electronic apparatus that includes the stopper and the groove block preventing the display section from the over-pivoting on the second shaft in the same direction several times and the cable from twisting off.

In the related art example described above, however, the hinge mechanism is provided with the stopper and the groove. Thus, if the user adds a strong rotation force to the display section, a large force is applied to the stopper and the groove according to the principles of a lever and it is feared that the stopper or the groove or the hinge mechanism may be broken.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 13A is an exemplary top view to show a moving projection of the lock mechanism shown in FIG. 11, FIG. 13B is an exemplary front view to show the moving projection, FIG. 13C is an exemplary side view to show the moving projection, and FIG. 13D is an exemplary rear view to show the moving projection;

DETAILED DESCRIPTION

Various embodiments according to the invention will be described hereinafter with reference to the accompanying drawings. In general, according to one embodiment of the invention, an electronic apparatus includes a main body, a display unit, a hinge portion and a first projection. The main body includes a first convex portion that is disposed on an upper face of the main body and includes a first engaging portion and a second convex portion that is disposed on the upper face and spaced from the first convex portion and includes a second engaging portion. The display unit includes a display surface, a rear surface disposed in an opposite side of the display surface and a leg portion configured so as to be engaged with the first convex portion and the second convex portion. The hinge portion joints the main body and the display unit. The hinge portion includes a rotation shaft rotatably supporting the display unit between a closed state in which the display unit covers the main body and an open state in which the display unit is risen relative to the main body and a pivot shaft swingably supporting the display unit between a first state in which the display surface faces the upper face of the main body and a second state in which the rear surface faces the upper face. The first projection is projecting from the leg portion in an axial direction of the rotation shaft. The first projection is engaged with the first engaging portion when the display unit is in the first state. The first projection is engaged with the second engaging portion when the display unit is in the second state.

Embodiments of electronic apparatuses will be discussed with reference to the accompanying drawings.

Figure 1:
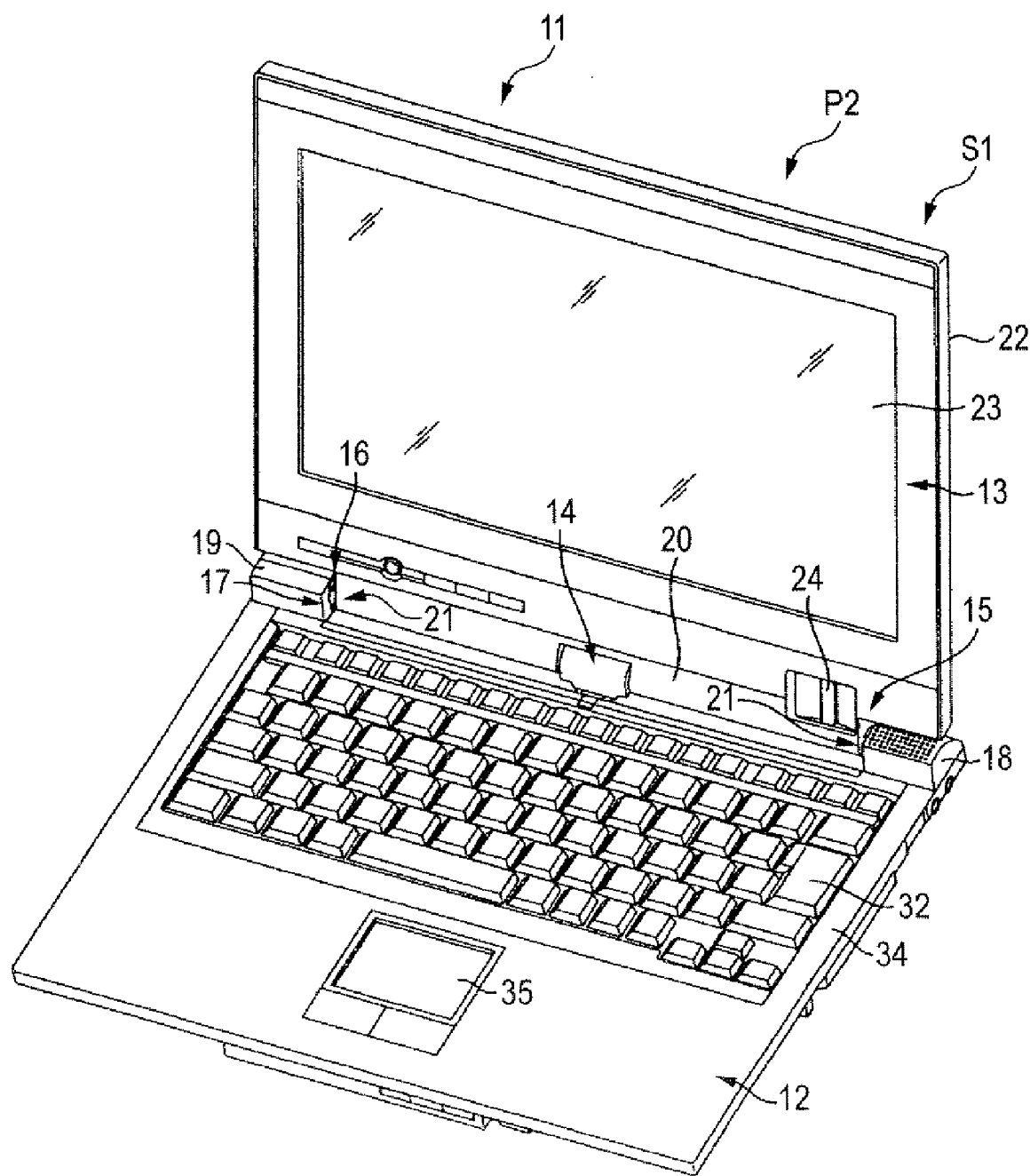
FIG. 1 is an exemplary perspective view to show a portable computer according to a first embedment of the invention in a first state and an open state.
Figure 2:
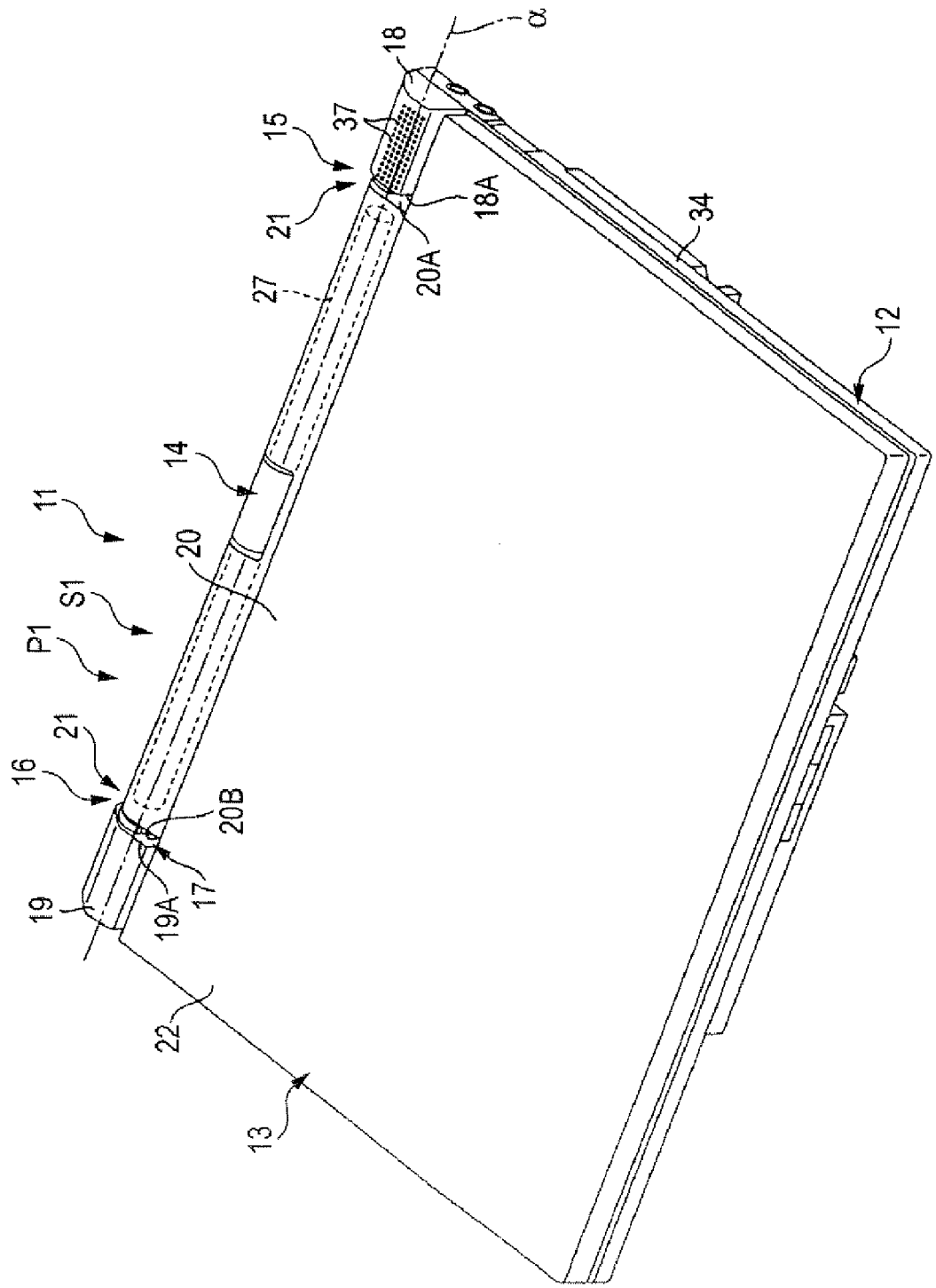
FIG. 2 is an exemplary perspective view to show a closed state of the portable computer shown in FIG. 1.
Figure 3:
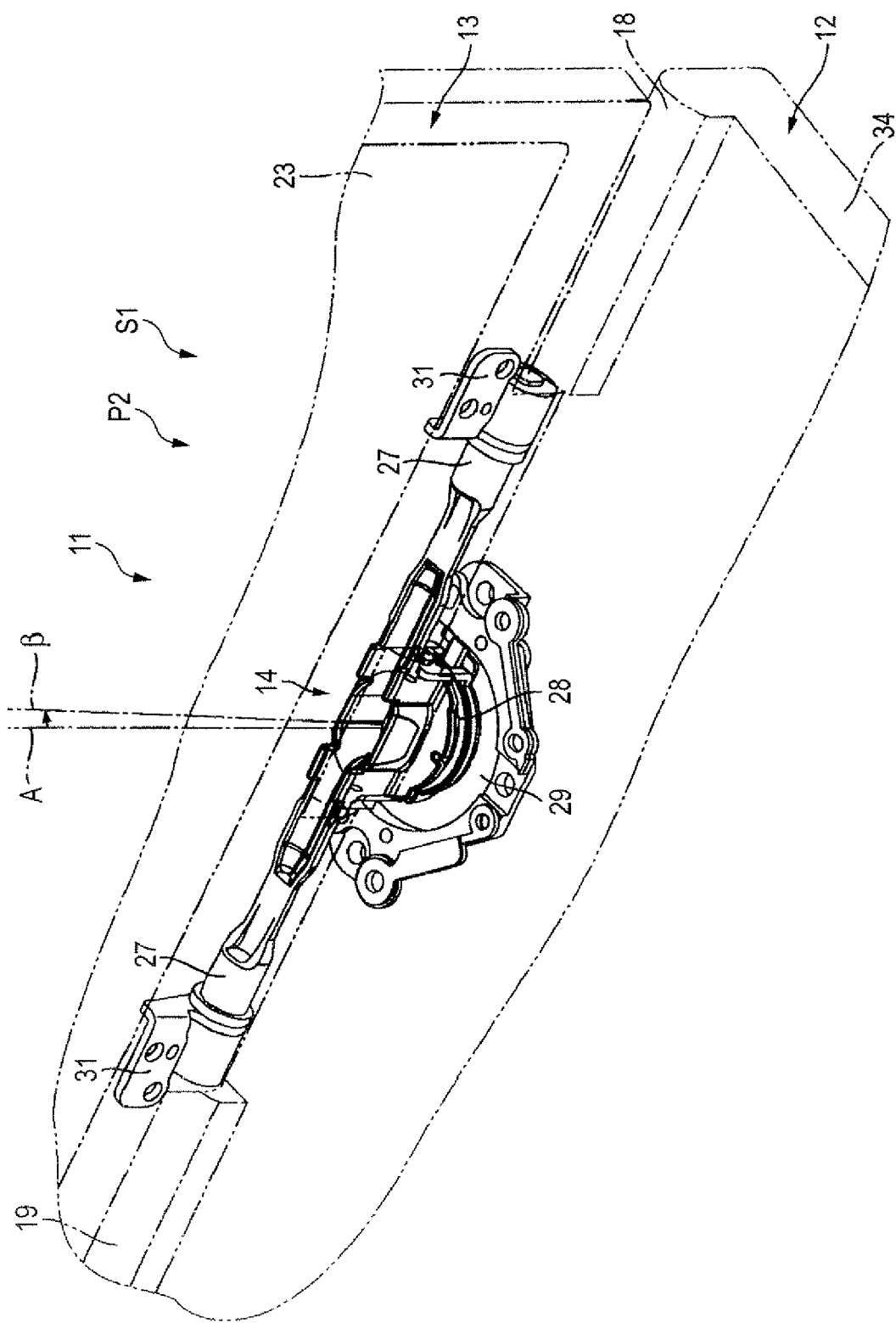
FIG. 3 is an exemplary perspective view to show a hinge mechanism of the portable computer shown in FIG. 1.

A portable computer 11 as an example of an electronic apparatus includes a main body 12, a display section 13, a hinge mechanism 14, a first pivot regulation mechanism 15, a second pivot regulation mechanism 16, a lock mechanism 17, a first convex part 18 and a second convex part 19 of a pair of convex parts, and an input pen (not shown), as shown in FIGS. 1 to 3. The display section 13 has a liquid crystal display 23 of a display surface having a tablet, a rear 22, and a fingerprint authentication device 24.

The liquid crystal display 23 is an example of a display connected to a circuit board contained in the main body 12 that displays information and may be a plasma display, organic electroluminescence, a surface conduction type electron emission element display, etc. The fingerprint authentication device 24 is provided in the proximity of the first pivot regulation mechanism 15 (described later) below the right of the display section 13.

The display section 13 has a leg part 20 joined to the main body 12 through the hinge mechanism 14, as shown in FIG. 1.

The hinge mechanism 14 has a rotation shaft 27, a pivot 28, and a base plate 29, as shown in FIG. 3. The hinge mechanism 14 joins the main body 12 and the display section 13. The rotation shaft (rotation arm) 27 extends in an axis $\alpha$ direction. A hinge bracket 31 is joined to an end part of the rotation shaft 27 and is fixed to the inside of the display section 13. The rotation shaft 27 is placed inside the leg part 20 of the display section 13.

The rotation shaft 27 enables the user to rotate the display section 13 on the axis $\alpha$, as shown in FIGS. 2 and 3. The rotation shaft 27 enables the user to rotate the display section 13 between a closed state P1 in which the display section 13 covers the main body 12 as shown in FIG. 2 and an open state P2 in which the display section 13 rises relative to the main body 12 as shown in FIG. 1.

The pivot 28 is joined to the rotation shaft 27 so that the rotation shaft 27 can be pivoted on an axis $\beta$. The axis $\beta$ is inclined in the rear direction of the main body 12 with respect to a normal A to the upper face of the main body 12. Thus, the pivot direction in which the display section 13 is pivoted is also inclined relative to the horizontal direction to prevent the lower end of the display section 13 from coming in contact with a keyboard 32 when the display section 13 is pivoted. The pivot 28 enables the user to pivot the display section 13 in the open state P2 between a first state S1 in which the liquid crystal display 23 shown in FIG. 1 faces the front and a second state S2 in which the rear 22 of the display section 13 shown in FIG. 22 faces the front. The base plate 29 supports the pivot 28 vertically.

The main body 12 has a resin cabinet 34, the first convex part 18 and the second convex part 19, the keyboard 32 placed on the top of the cabinet 34, and a touch pad 35. The first convex part 18 and the second convex part 19 project upward from the top of the back of the cabinet 34. Mutually opposed sides 18A and 19A of the first convex part 18 and the second convex part 19 are provided with a pair of engaging parts 21, as shown in FIG. 2. The pair of engaging parts 21 contains a first engaging part 42 and a second engaging part 46 as described later. The first convex part 18 and the second convex part 19 contain each a loudspeaker and have holes 37 for the loudspeaker. The hinge mechanism 14 is placed between the first convex part 18 and the second convex part 19.

Figure 4:
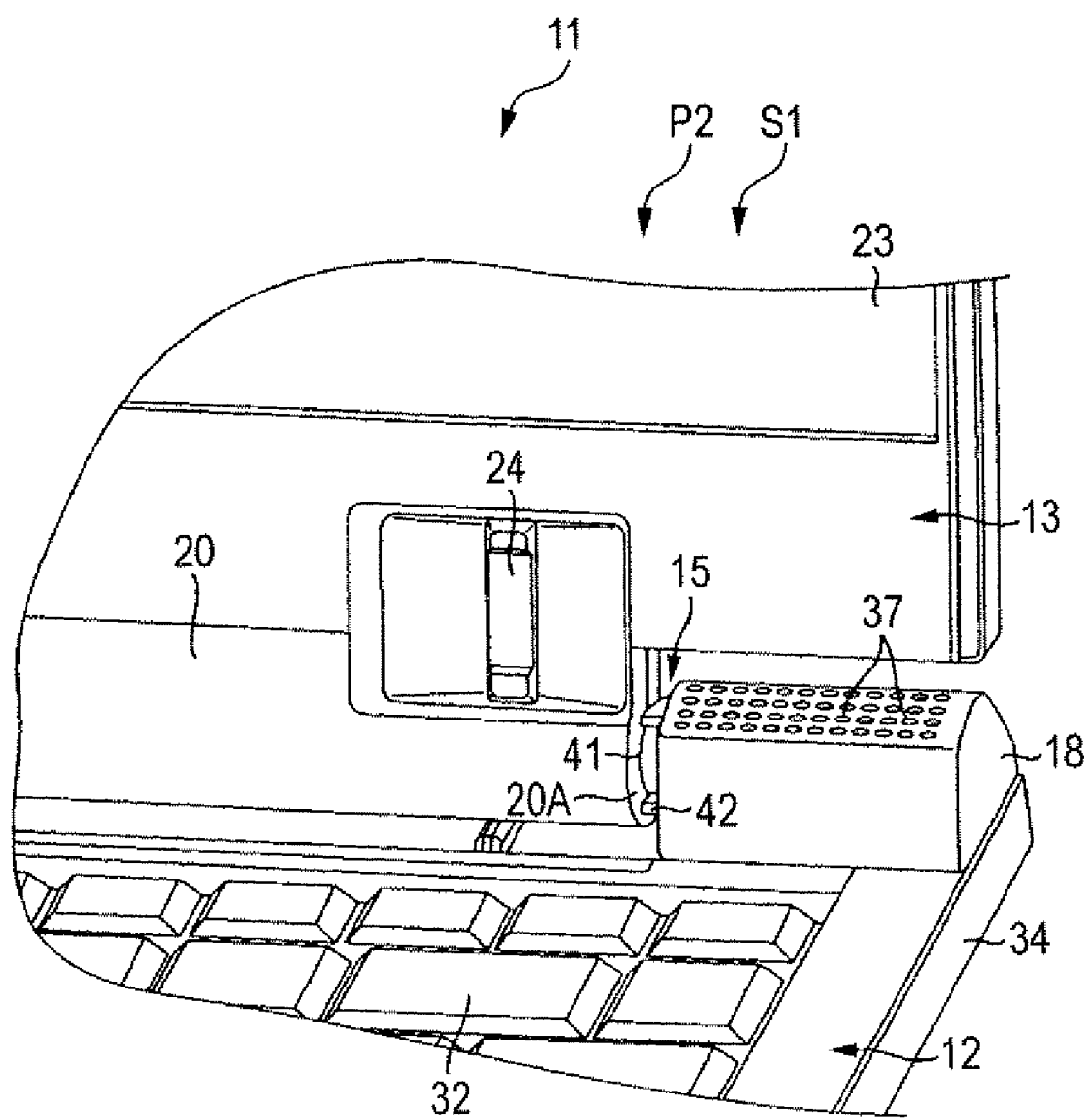
FIG. 4 is an exemplary perspective view to show a first pivot regulation mechanism of the portable computer shown in FIG. 1.
Figure 5:
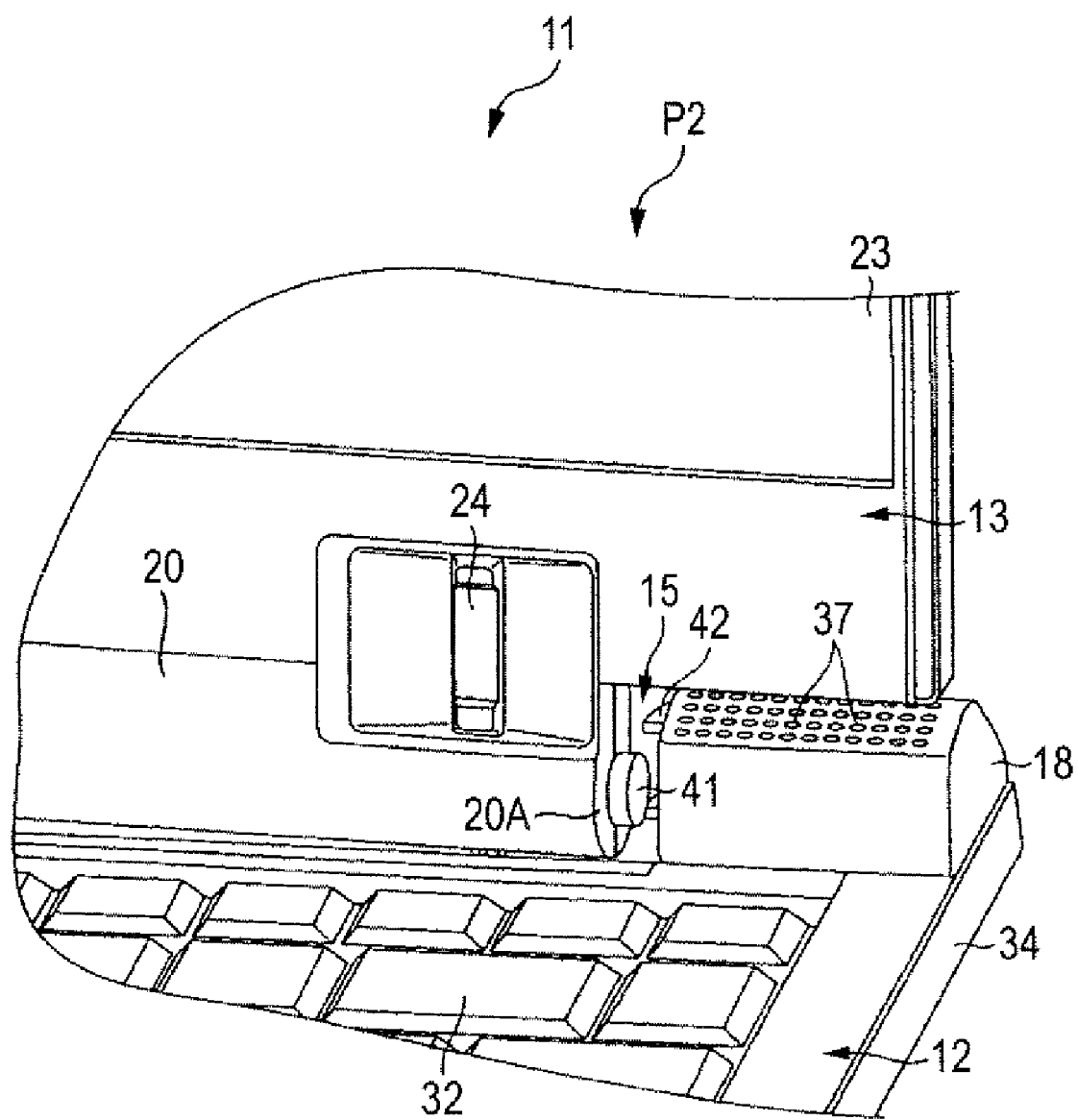
FIG. 5 is an exemplary perspective view to show the first pivot regulation mechanism shown in FIG. 4 in a state in which a display section is pivoted.
Figure 6:
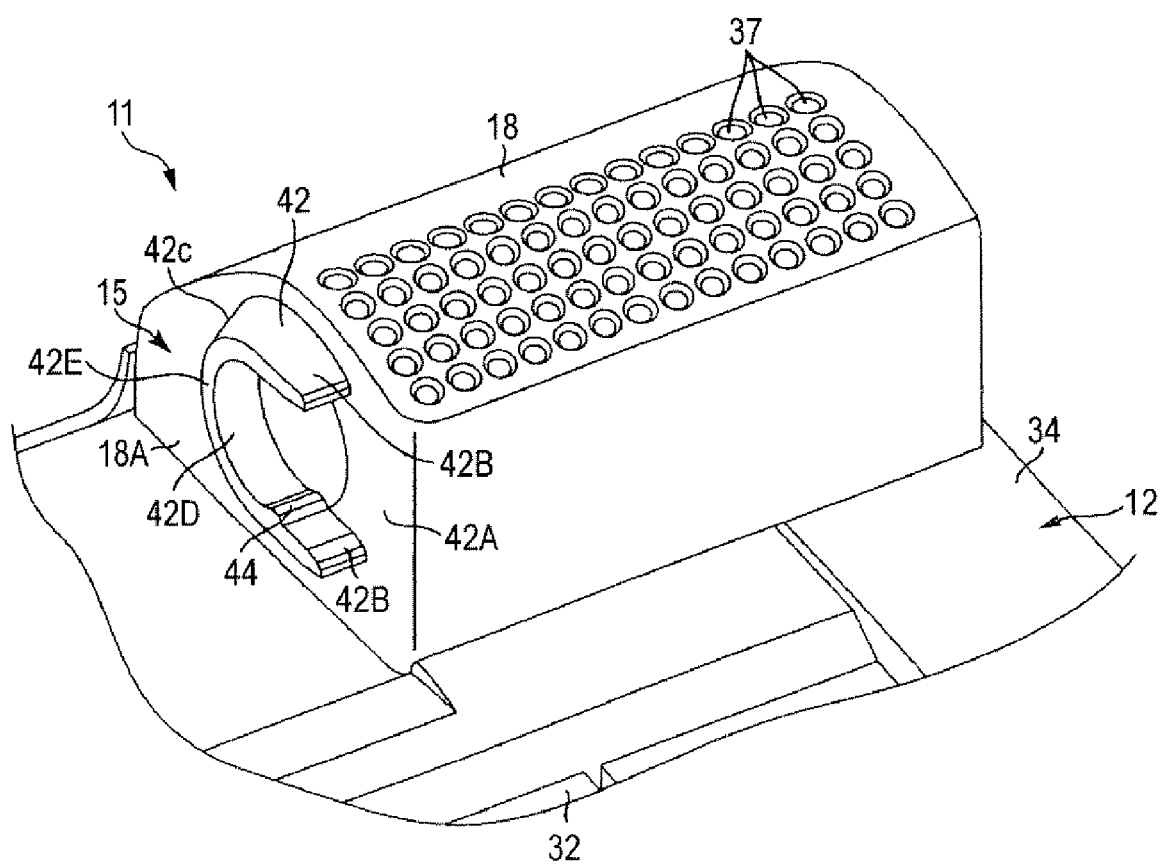
FIG. 6 is an exemplary perspective view to show a first engaging part of the first pivot regulation mechanism shown in FIG. 4.

The first pivot regulation mechanism 15 is provided between a side 20A of the leg part 20 and the side 18A of the first convex part 18, as shown in FIGS. 2 and 4. The first pivot regulation mechanism 15 regulates the pivot direction of the display section 13 to one direction. It includes a fix projection 41 of a first projection formed so as to project in the axis $\alpha$ direction from the side 20A of the leg part 20 and the first engaging part 42 formed on the side 18A of the first convex part 18 as one of the paired engaging parts 21, as shown in FIGS. 5 and 6. The fix projection 41 is formed of a resin, for example, like a circular cylinder. The center of the fix projection 41 is placed on an extension of the axis $\alpha$ of the rotation shaft 27. Thus, the fix projection 41 rotates on the axis $\alpha$ as the display section 13 is in the first state S1 and rotates between the open state P2 and the closed state P1. The fix projection 41 as the first projection is engaged to the first engaging part 42 as one of the paired engaging parts 21 when the display section 13 is in the first state S1; the fix projection 41 is engaged to the second engaging part 46 as the other of the paired engaging parts 21 when the display section 13 is in the second state S2.

Figure 7:
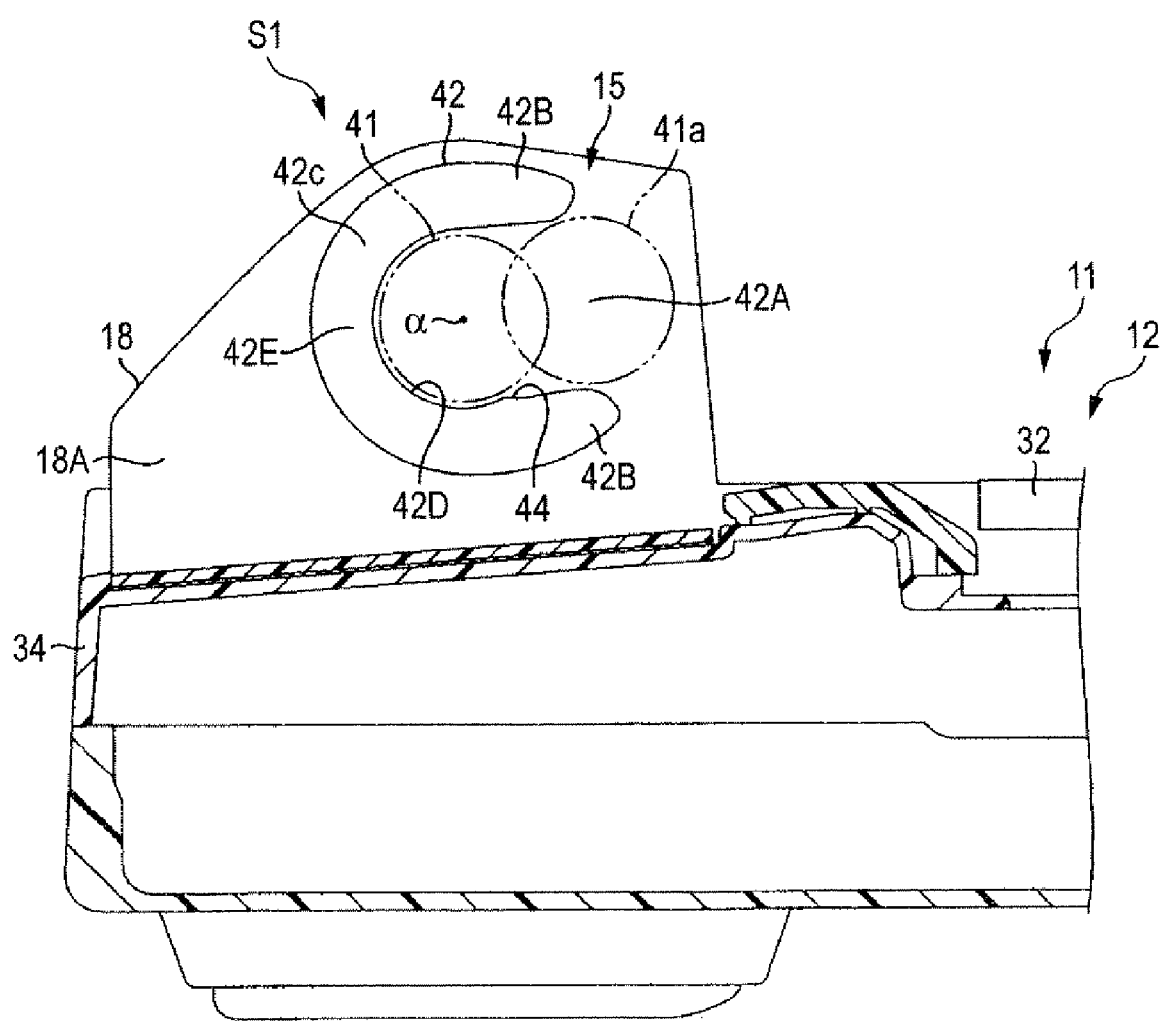
FIG. 7 is an exemplary sectional view to show the first engaging part shown in FIG. 6.

The first engaging part 42 is formed like a horseshoe shape closed in the rear direction of the portable computer 11, for example, and is formed integral with the first convex part 18, as shown in FIGS. 6 and 7. The first engaging part 42 has an opening 42A opened toward the pivot direction of the pivot 28, and the opening 42A is placed in the direction of pivoting the fix projection 41 together with the display section 13. In the embodiment, the pivot direction of the display section 13 is inclined upward with respect to the horizontal direction as described above. Thus, the opening 42A of the first engaging part 42 faces in a slanting upward direction. The first engaging part 42 is formed like a horseshoe shape, but is not limited to the shape. The first engaging part 42 may be shaped like a letter C, angular U, "<," or a letter U or may be shaped like a hook in which the fix projection 41 can be hooked.

The first engaging part 42 includes a pair of end parts 42B that defines the open end of the opening 42A. Of the pair of end parts 42B, the end part 42B positioned in the lower part is shaped like a taper gradually decreasing in size to a tip. When the display section 13 is pivoted from the second state S2 shown in FIG. 24 to the first state S1 shown in FIG. 1, the pivoting fix projection 41a is guided along the tapered face of the end part 42B and the fix projection 41 is fitted into the first engaging part 42, as shown in FIG. 7. However, of the pair of end parts 42B, only the end part 42B positioned in the upper part may be shaped like a taper or both tips of the pair of end parts 42B may be shaped like a taper.

Figure 8:
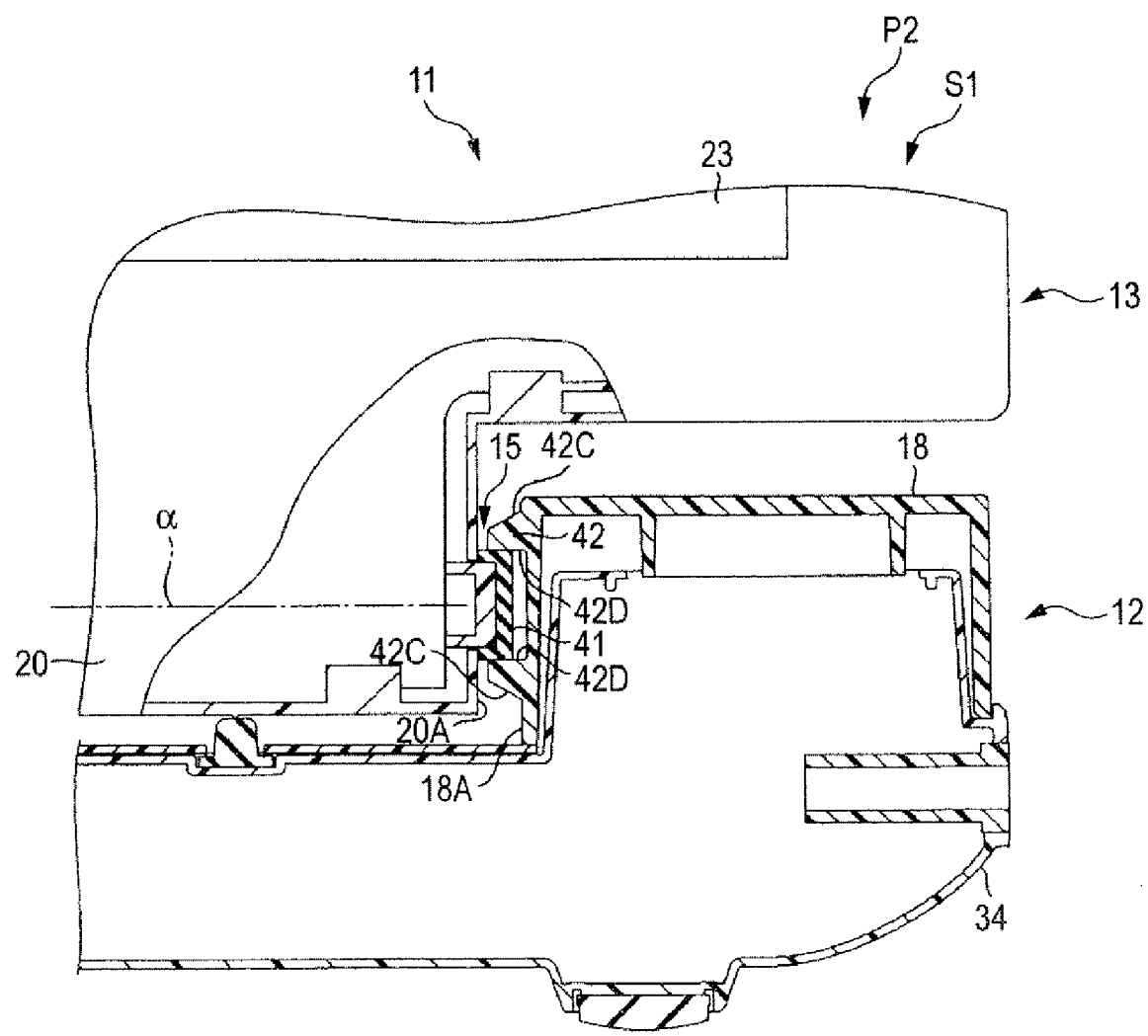
FIG. 8 is an exemplary sectional view to show the first pivot regulation mechanism shown in FIG. 4 as it is cut out in a vertical direction.

As shown in FIGS. 6 and 8, at least an outer peripheral portion 42C of the first engaging part 42 at an opposite position to the opening 42A is shaped like a taper, allowing the lock mechanism 17 (described later) to easily climb over the first engaging part 42. On the other hand, an inner peripheral portion 42D of the first engaging part 42 is orthogonal to the side 18A of the first convex part 18, as shown in FIG. 8.

The first engaging part 42 has a wall part 42E on the opposite side to the opening 42A in the pivot direction of the pivot 28, as shown in FIG. 7. The fix projection 41 as the first projection abuts the wall part 42E of the first engaging part 42, thereby regulating pivoting of the display section 13 in the opposite direction to the pivot direction.

When the display section 13 is in the first state S1, the fix projection 41 is exactly fitted into the first engaging part 42 so as to be surrounded by the first engaging part 42, as shown in FIGS. 7 and 8. In this state, to rotate the display section 13 between the open state P2 shown in FIG. 1 and the closed state P1 shown in FIG. 2, the fix projection 41 is supported in the up and down direction and the rear direction by the first engaging part 42. Thus, the first engaging part 42 also serves as a bearing for the fix projection 41 rotating with rotation of the display section 13.

The first engaging part 42 has a first removal prevention part 44 slightly swelling from the bottom of the inner peripheral portion 42D, as shown in FIG. 7. The first removal prevention part 44 prevents the fix projection 41 from being easily removed from the first engaging part 42 when the display section 13 rotates, etc.

Figure 9:
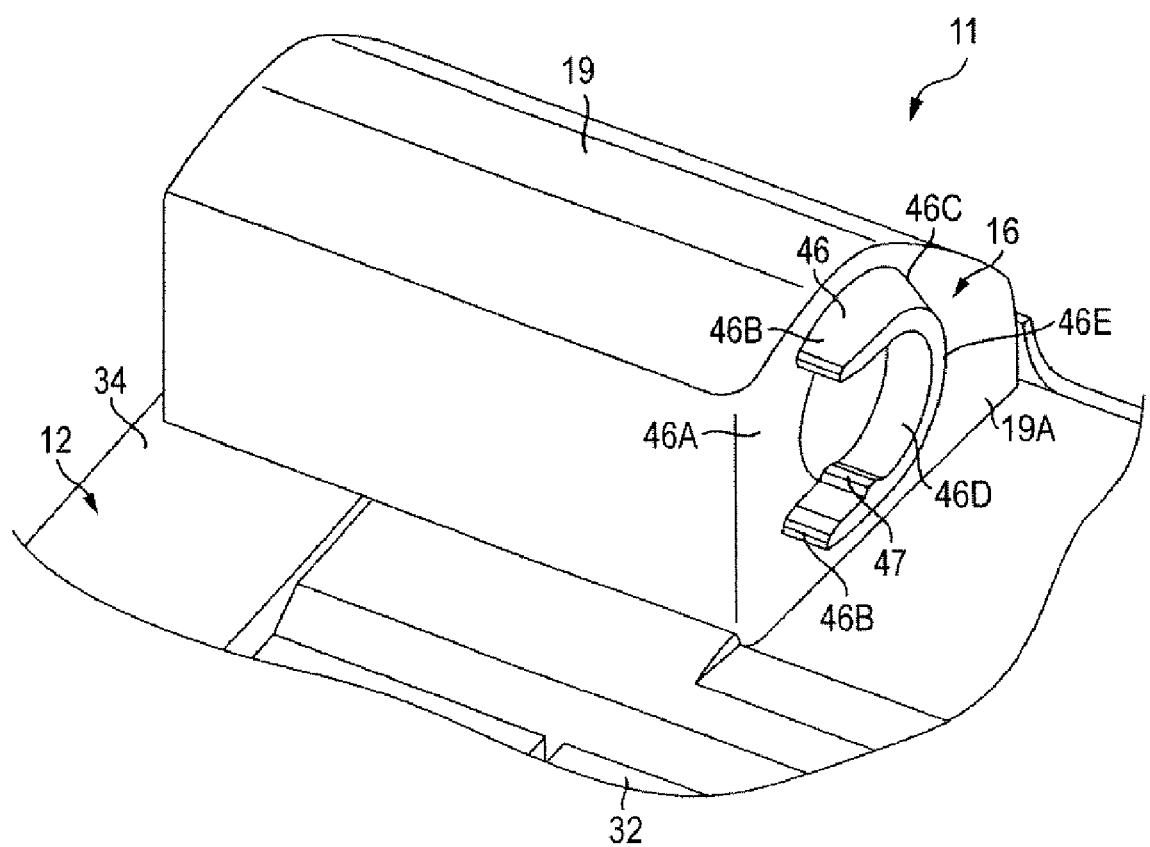
FIG. 9 is an exemplary perspective view to show a second pivot regulation mechanism of the portable computer shown in FIG. 1.

The second pivot regulation mechanism 16 is provided between the side 20A of the leg part 20 and the side 19A of the second convex part 19, as shown in FIGS. 2 and 7. The second pivot regulation mechanism 16 is provided on the opposite side to the first pivot regulation mechanism 15 with the center of the hinge mechanism 14, as shown in FIGS. 2 and 9. The second pivot regulation mechanism 16 defines the angles at which the display section 13 can be pivoted.

Figure 10:
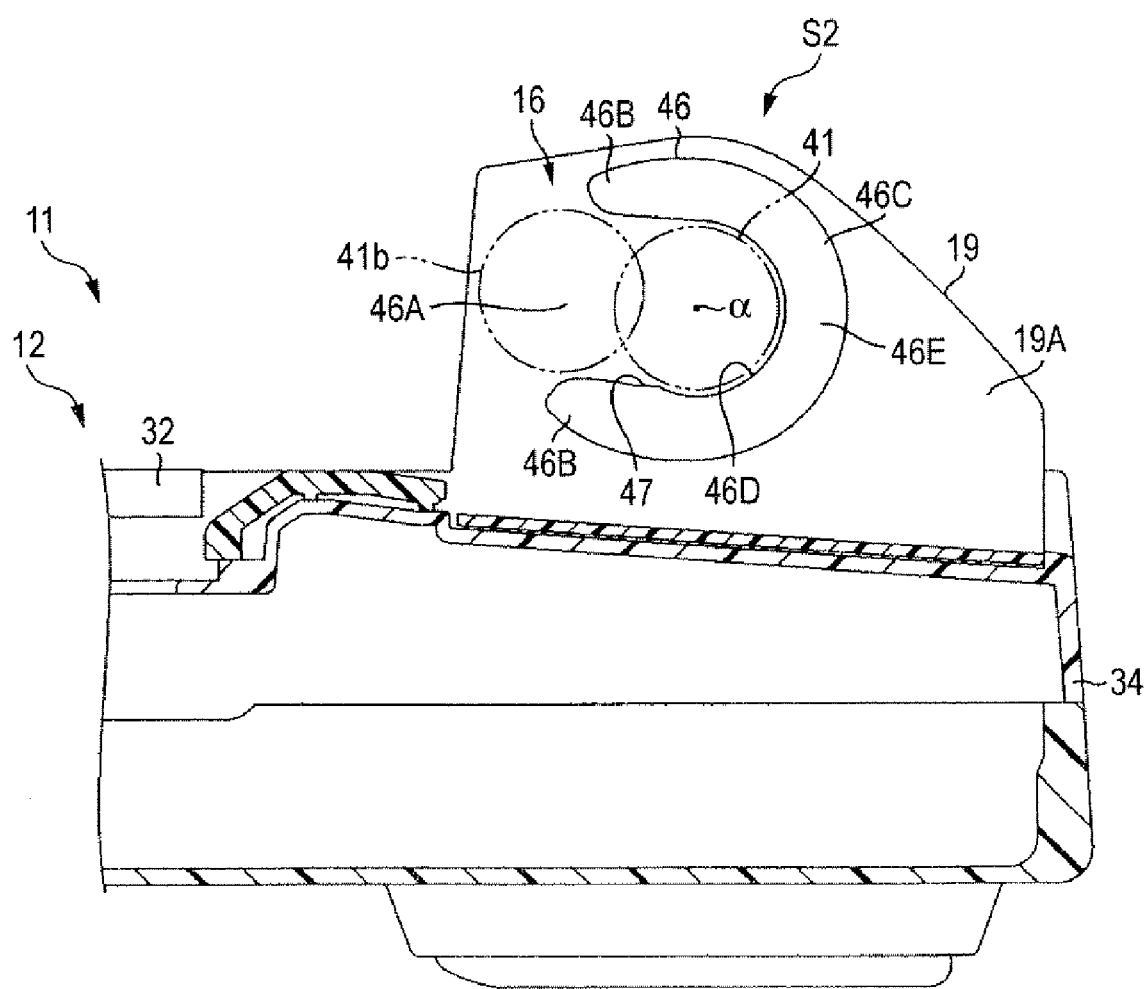
FIG. 10 is an exemplary sectional view to show a second engaging part of the second pivot regulation mechanism shown in FIG. 1.

The second pivot regulation mechanism 16 includes the above-described fix projection 41 and the second engaging part 46 formed on the side 19A of the second convex part 19 as the other of the paired engaging parts 21, as shown in FIGS. 9 and 10. That is, when the display section 13 is in the second state S2 shown in FIG. 24, the fix projection 41 pivots to the opposite side with the center of hinge mechanism 14 and functions as a part of the second pivot regulation mechanism 16. This means that the fix projection 41 is shared by the first pivot regulation mechanism 15 and the second pivot regulation mechanism 16. When the display section 13 is in the second state S2, the center of the fix projection 41 is placed on an extension of the axis α of the rotation shaft 27. The fix projection 41 rotates on the axis α as the display section 13 is in the second state S2 and rotates between the open state P2 and the closed state P1.

The second engaging part 46 is formed like a horseshoe shape closed in the rear direction of the portable computer 11 and is formed integral with the second convex part 19, as shown in FIG. 10. The second engaging part 46 has an opening 46A opened toward the pivot direction of the pivot 28, and the opening 46A is placed in the direction of receiving the fix projection 41 pivoted together with the display section 13. In the embodiment, the pivot direction of the display section 13 is inclined upward with respect to the horizontal direction as described above. Thus, the second engaging part 46 has the opening 46A directed in a slanting upward direction. The second engaging part 46 is formed like a horseshoe shape, but is not limited to the shape. The second engaging part 46 may be shaped like a letter C, angular U, "<," or a letter U or may be shaped like a hook in which the fix projection 41 can be hooked.

The second engaging part 46 includes a pair of end parts 46B that defines the open end of the opening 46A. Of the pair of end parts 46B, the end part 46B positioned in the lower part is shaped like a taper gradually decreasing in size to a tip. When the display section 13 is pivoted from the first state S1 shown in FIG. 1 to the second state S2 shown in FIG. 24, the pivoting fix projection 41b is guided along the tapered face of the end part 46B and the fix projection 41 is fitted into the first engaging part 42, as shown in FIG. 10. However, only the pair of end parts 46B may be shaped like a taper or both tips of the pair of end parts 46B may be shaped like a taper.

Figure 15:
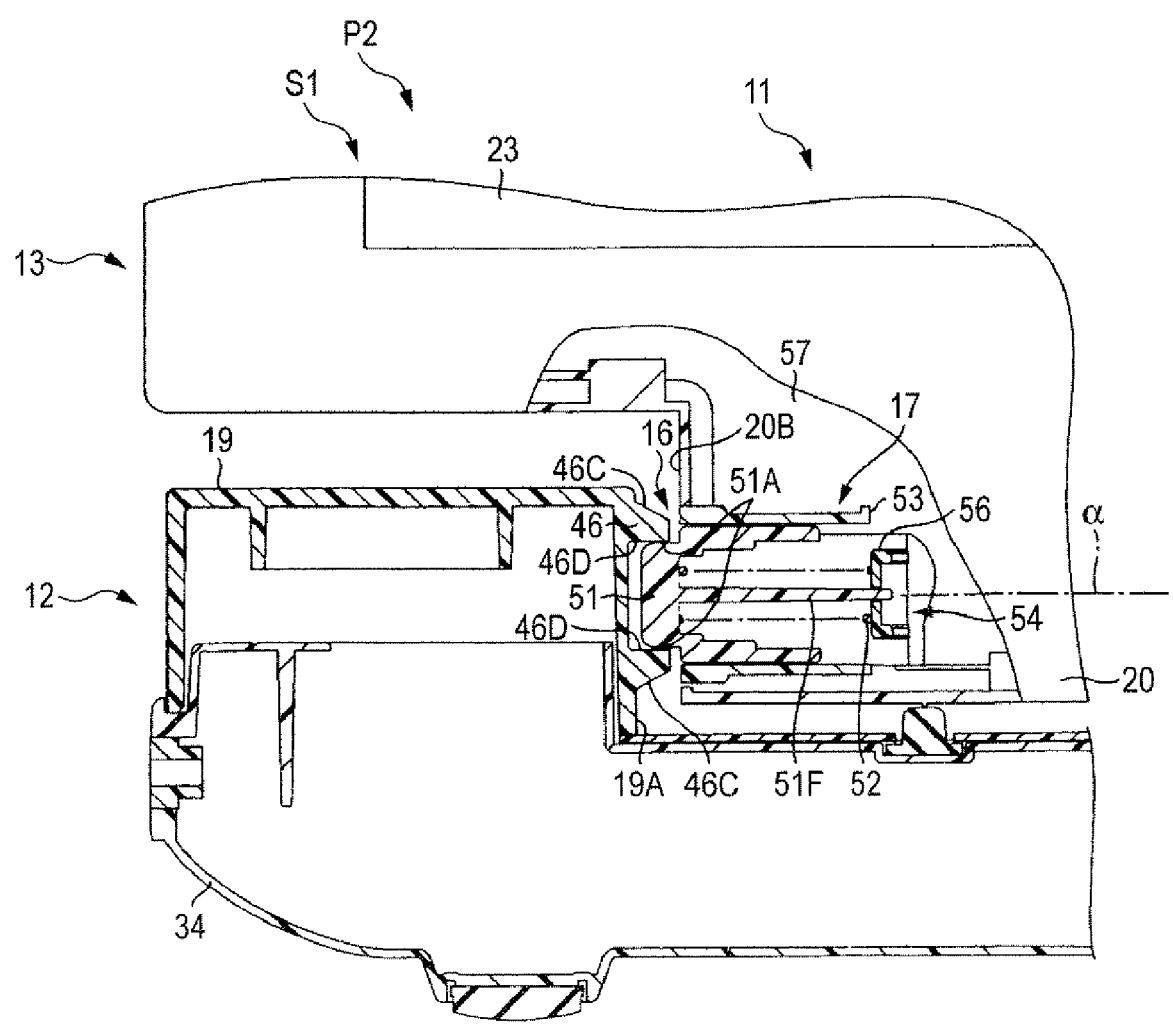
FIG. 15 is an exemplary sectional view to show the lock mechanism shown in FIG. 11 cut in a vertical direction.

As shown in FIGS. 9 and 15, at least an outer peripheral portion 46C of the second engaging part 46 at an opposite position to the opening 46A is shaped like a taper, allowing the lock mechanism 17 (described later) to easily climb over the second engaging part 46. On the other hand, an inner peripheral portion 46D of the second engaging part 46 is orthogonal to the side 19A of the second convex part 19, as shown in FIG. 15.

When the display section 13 is in the first state S2, the fix projection 41 is exactly fitted into the second engaging part 46 so as to be surrounded by the second engaging part 46, as shown in FIG. 10. When the display section 13 is rotated between the open state P2 shown in FIG. 24 and the closed state P1 shown in FIG. 25, the fix projection 41 is supported in the up and down direction and the rear direction by the second engaging part 46. Thus, the second engaging part 46 also serves as a bearing for the fix projection 41 rotating with rotation of the display section 13.

The second engaging part 46 has a second removal prevention part 47 slightly swelling from the bottom of the inner peripheral portion 46D, as shown in FIG. 10. The second removal prevention part 47 prevents the fix projection 41 from being easily removed from the second engaging part 46 when the display section 13 rotates, etc.

The second engaging part 46 has a wall part 46E on the opposite side to the opening 46A in the pivot direction of the pivot 28, as shown in FIG. 10. The fix projection 41 abuts the wall part 46E of the second engaging part 46, thereby regulating pivoting of the display section 13 in the opposite direction to the pivot direction.

Figure 11:
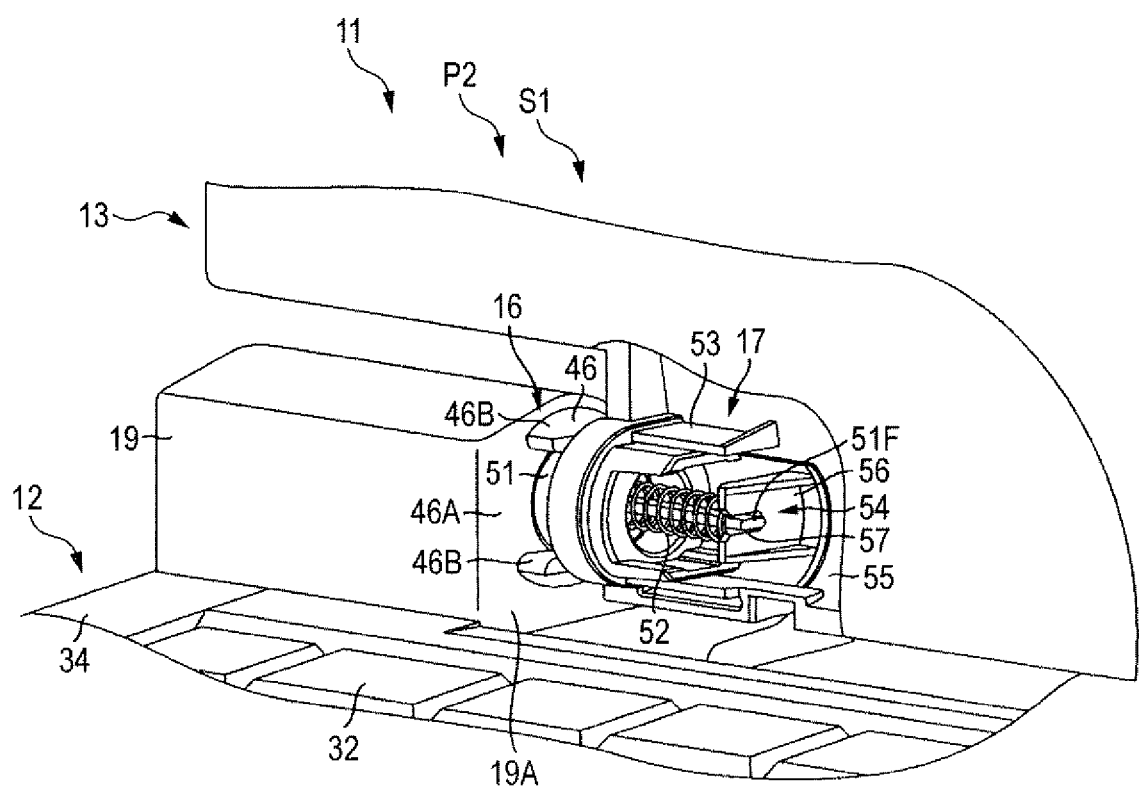
FIG. 11 is an exemplary perspective view to show a lock mechanism from the front direction, the display section of the portable computer shown in FIG. 1 being partially broken away.
Figure 12:
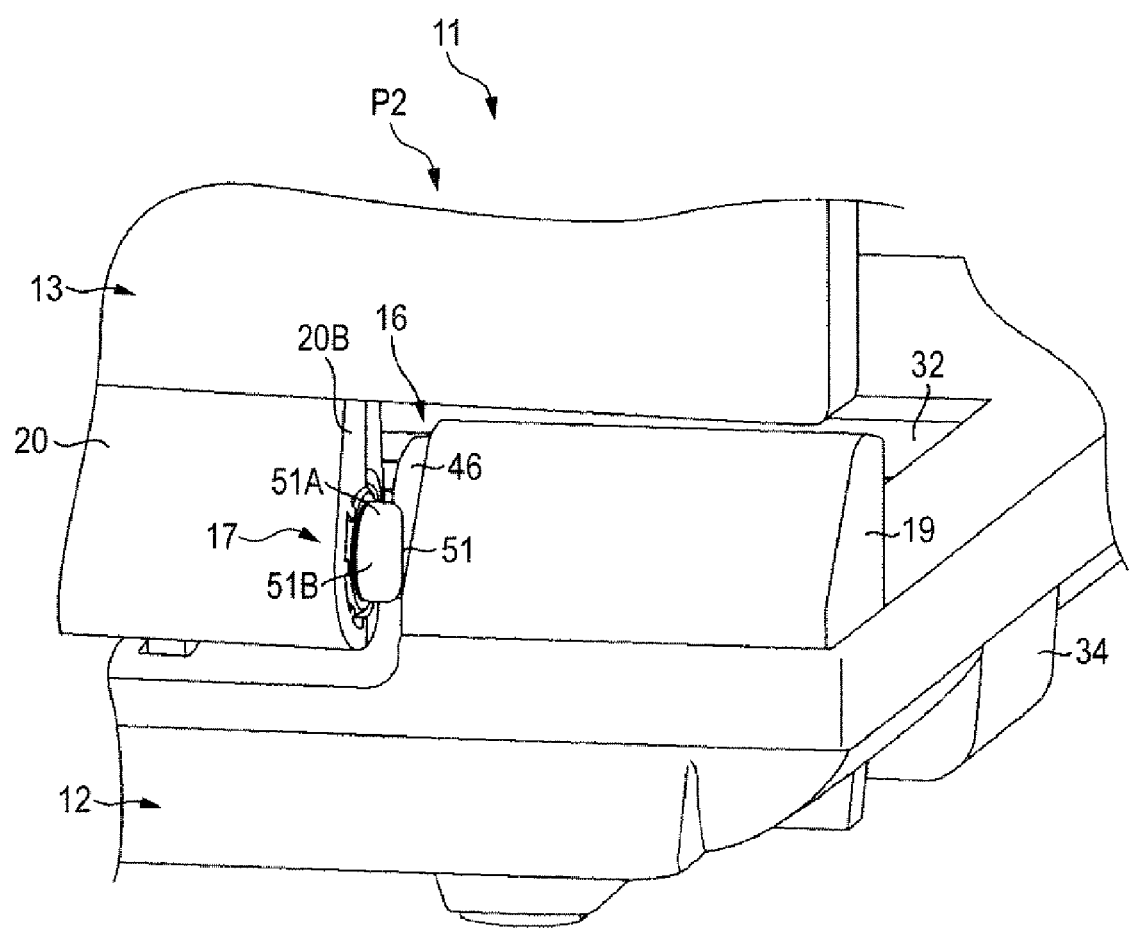
FIG. 12 is an exemplary perspective view to show the lock mechanism shown in FIG. 11 from the rear direction

FIGS. 11 to 13 show the lock mechanism 17. The lock mechanism 17 is provided at the left of the portable computer 11 on an extension of the rotation shaft 27. It is provided in the outer peripheral portion of the display section 13 and is positioned on the opposite side to the fix projection 41 with the center of hinge mechanism 14. The lock mechanism 17 allows the display section 13 to pivot when the display section 13 is in the open state P2, and blocks further pivoting of the display section 13 when the display section 13 is in the closed state P1.

The lock mechanism 17 has a moving projection 51 of a second projection formed so as to project in the axis α direction from the side 20B of the leg part 20 movably in the axis α direction, a spring member 52 that urges the moving projection 51 in the direction projecting from the leg part 20, a guide rib 53 that guides movement of the moving projection 51, and a rotation block mechanism 54 that blocks rotation of the moving projection 51. The spring member 52 is a compression spring and can receive retreat of the moving projection 51. The guide rib 53 projects from the inner face of the cabinet 55 of the display section 13.

The moving projection 51 has a shape provided by chaffering a part of a circular cylindrical shape of the same diameter as the fix projection 41 like a taper, as shown in FIGS. 13A to 13D. The moving projection 51 has a circular arc part 51A and a first tapered face 51B and a second tapered face 51C. The circular arc part 51A is shaped like a circular arc of the same diameter as the fix projection 41. The first tapered face 51B and the second tapered face 51C are configured so as to slide along the first engaging part 42 and the second engaging part 46.

A top face 51D and a side 51E are at the right angle, and abut the first engaging part 42 and the second engaging part 46 when the display section 13 is in the closed state P1, as shown in FIG. 13C. The first tapered face 51B is slanted relative to the top face 51D and the side 51E, as shown in FIG. 13A. Likewise, the second tapered face 51C is slanted relative to the top face 51D and the side 51E. The first tapered face 51B and the second tapered face 51C are formed to be opposed each other with the center of the top face 51D, as shown in FIG. 13B.

Figure 14A:
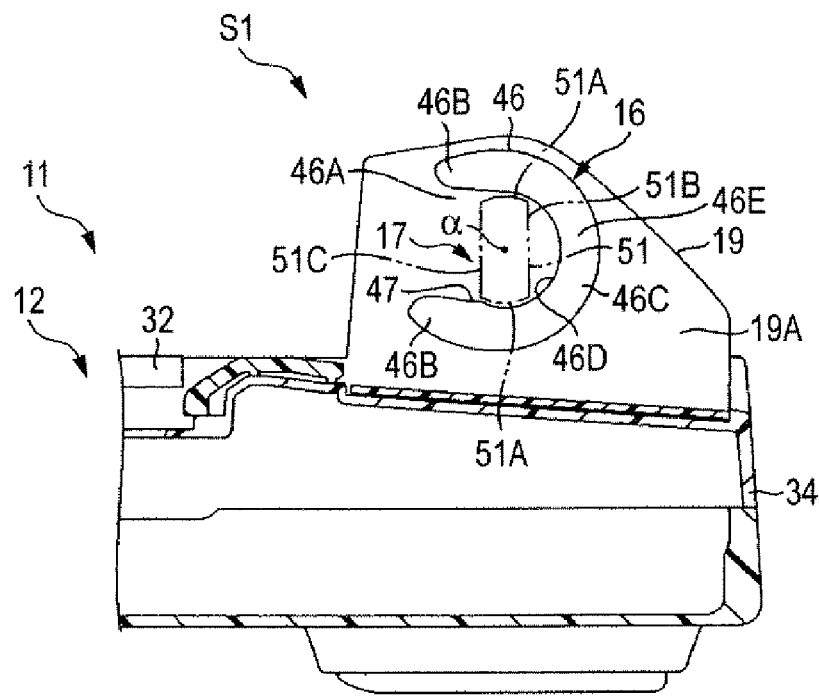
FIG. 14A is an exemplary sectional view to show a state in which the moving projection shown in FIGS. 13A to 13D is fitted into the second engaging part.
Figure 14B:
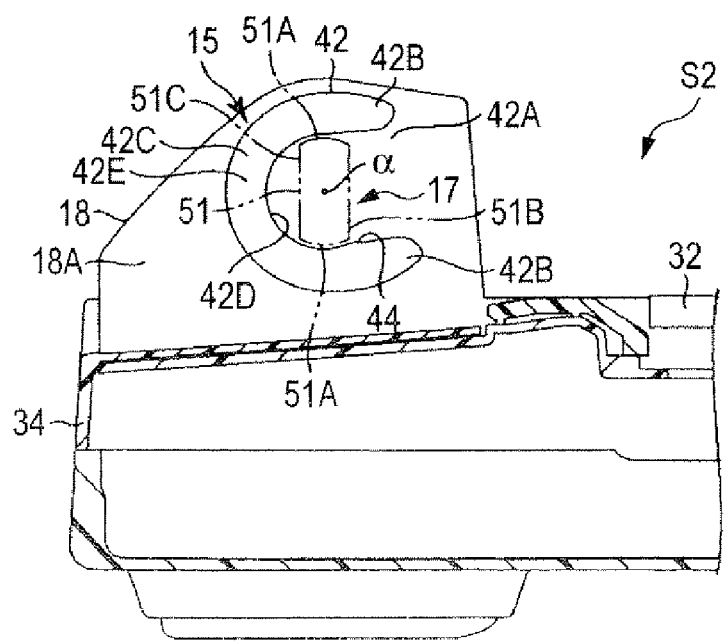
FIG. 14B is an exemplary sectional view to show a state in which the moving projection shown in FIGS. 13A to 13D is fitted into the first engaging part.

The moving projection 51 is fitted so as to be engaged to the inside of the second engaging part 46 of the second pivot regulation mechanism 16 when the display section 13 is in the first state S1, as shown in FIG. 14A; the moving projection 51 is fitted so as to be engaged to the inside of the first engaging part 42 of the first pivot regulation mechanism 15 when the display section 13 is in the second state S2, as shown in FIG. 14B. The moving projection 51 on an extension of the rotation shaft 27 is rotated with rotation of the display section 13 in a state in which it is fitted into the second engaging part 46. Likewise, the moving projection 51 is rotated with rotation of the display section 13 in a state in which it is fitted into the first engaging part 42.

When the display section 13 is rotated between the open state P2 shown in FIG. 1 and the closed state P1 shown in FIG. 2, the moving projection 51 is supported in the up and down direction and the rear direction by the second engaging part 46, as shown in FIGS. 14A and 15. Therefore, the second engaging part 46 also serves as a bearing for the rotating moving projection 51. When the display section 13 is rotated between the open state P2 shown in FIG. 24 and the closed state P1 shown in FIG. 25, the moving projection 51 is supported in the up and down direction and the rear direction by the first engaging part 42, as shown in FIG. 14B. Therefore, the first engaging part 42 also serves as a bearing for the rotating moving projection 51.

The rotation block mechanism 54 is provided between the moving projection 51 and a rib piece 56 projected from the inner face of the cabinet 55, as shown in FIG. 11. The rotation block mechanism 54 is made up of a shaft 51F rectangular in cross section provided in the moving projection 51 and a rectangular groove 57 that allows the shaft 51F to pass through the rib piece 56. That is, the shaft 51F is fitted into the groove 57, thereby suppressing rotation of the moving projection 51.

Subsequently, the pivot operation of the display section 13 will be discussed with reference to FIGS. 16 to 25. The portable computer 11 of the embodiment is intended for the right-handed user by way of example and to rotate the display section 13 from the first state S1 in FIG. 1 to the second state S2 in FIG. 22, the user pivots the display section 13 on the pivot 28 clockwise with user's right hand.

Figure 16:
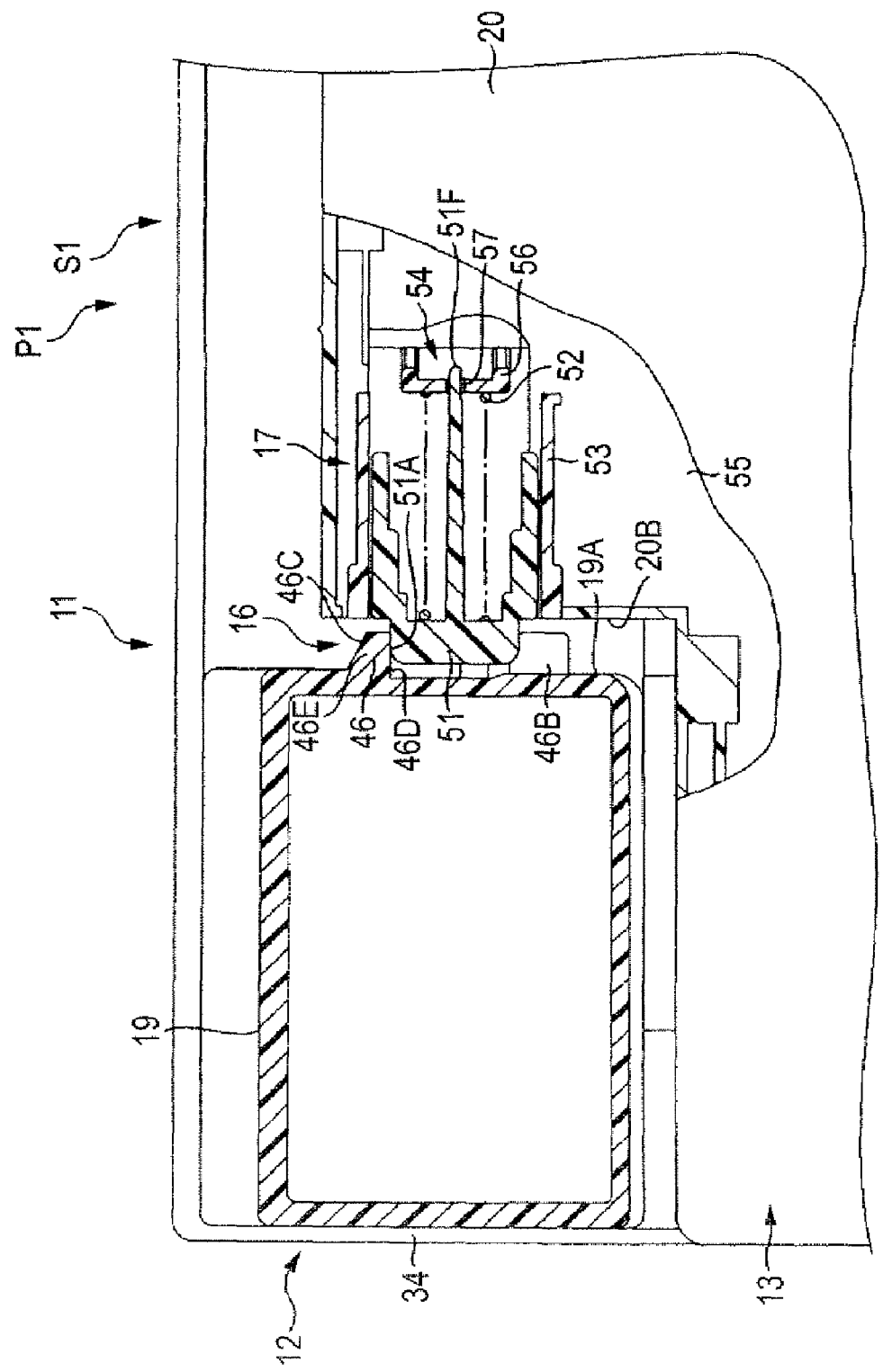
FIG. 16 is an exemplary sectional view to show the lock mechanism shown in FIG. 11 cut in a horizontal direction with the display section set in the closed state.

When the display section 13 is in the closed state P1 as shown in FIG. 2, the lock mechanism 17 abuts the wall part 46E of the second engaging part 46 by means of the circular arc part 51A of the moving projection 51 as shown in FIG. 16. On the opposite side, the fix projection 41 also abuts the wall part 42E of the first engaging part 42. Thus, in the closed state P1, the display section 13 is prevented from pivoting.

Figure 17:
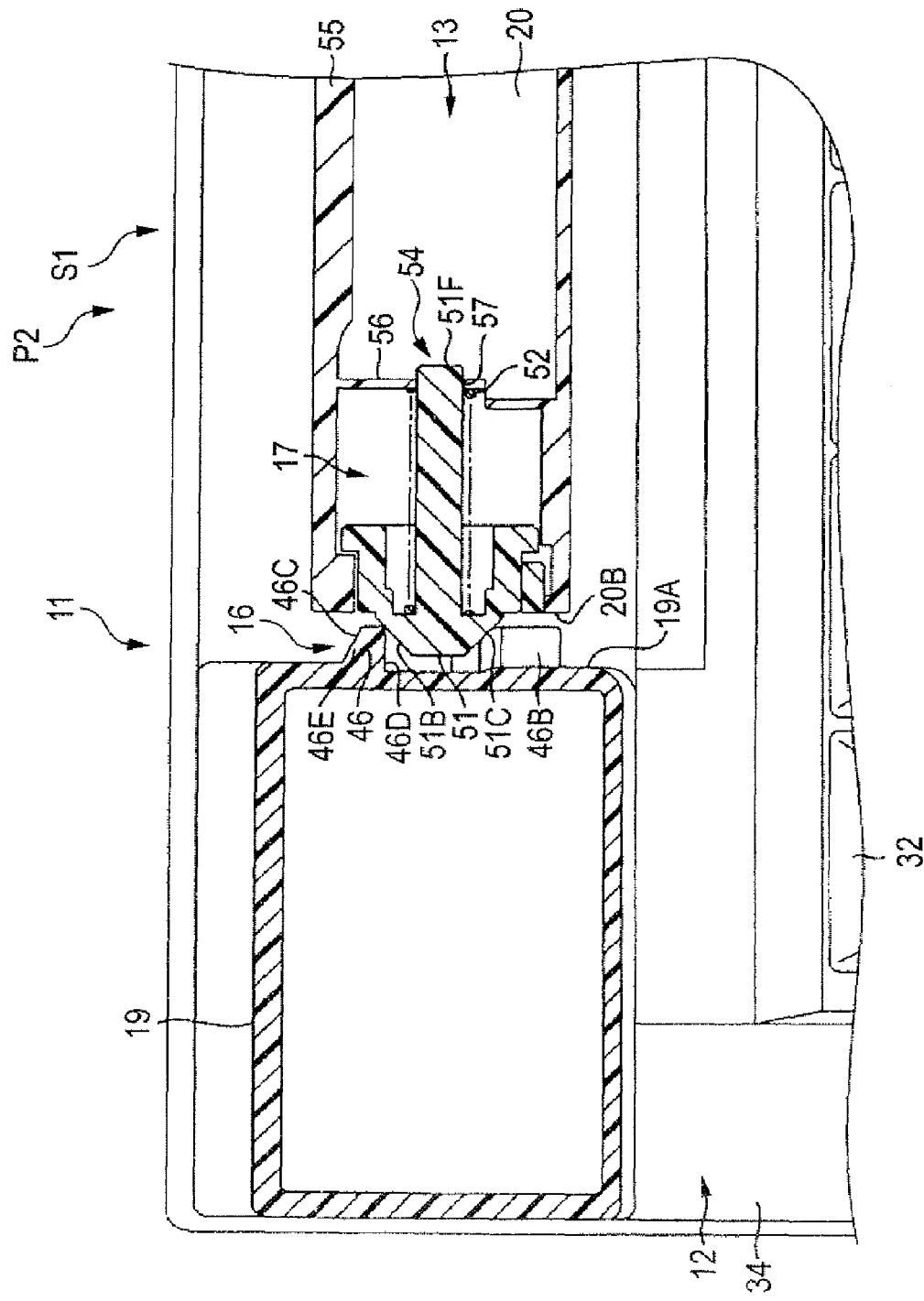
FIG. 17 is an exemplary sectional view to show the lock mechanism shown in FIG. 16 cut in the horizontal direction with the display section set in the open state.
Figure 18:
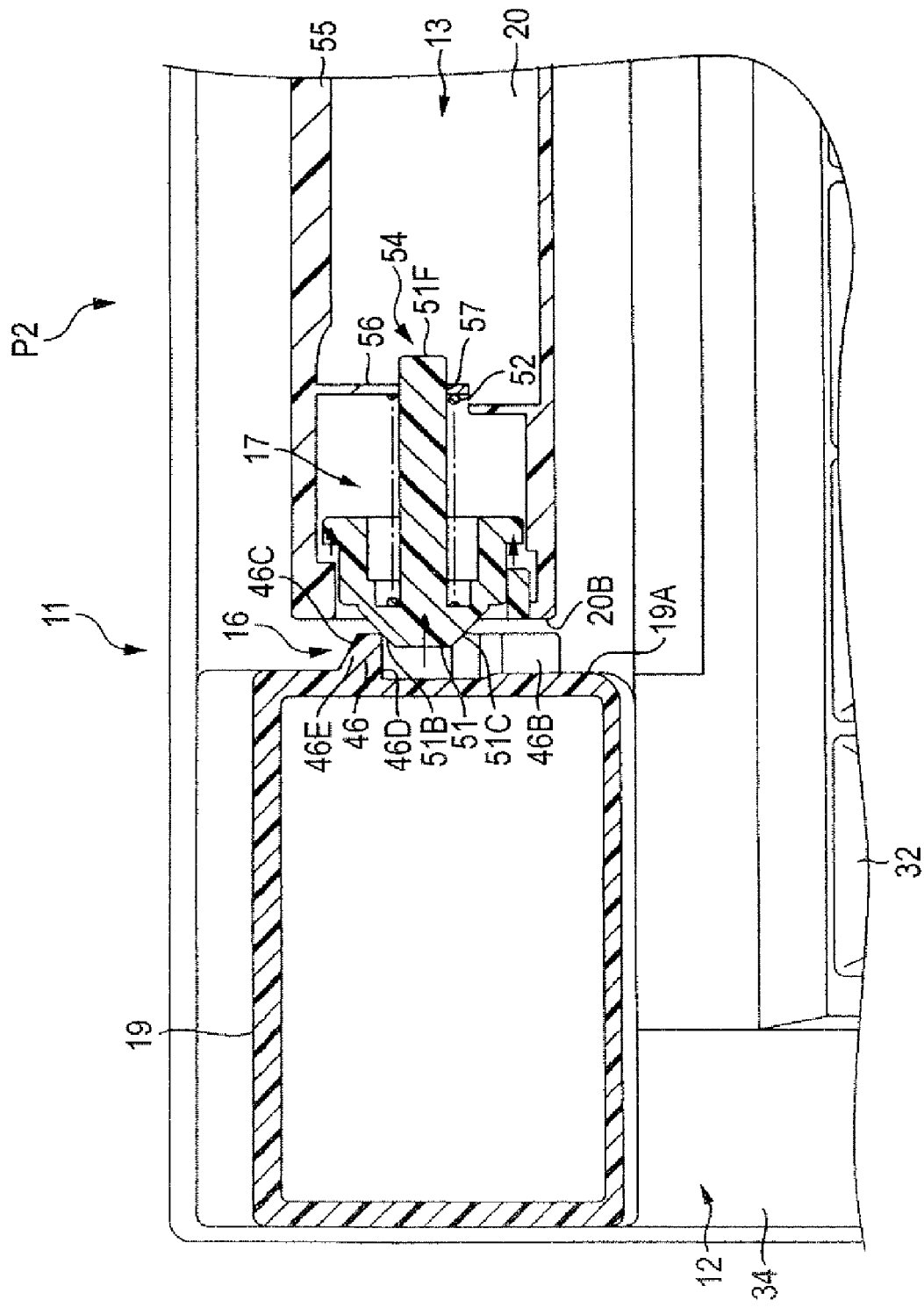
FIG. 18 is an exemplary sectional view to show a state in which the moving projection of the lock mechanism shown in FIG. 17 is climbing over the second engaging part.
Figure 19:
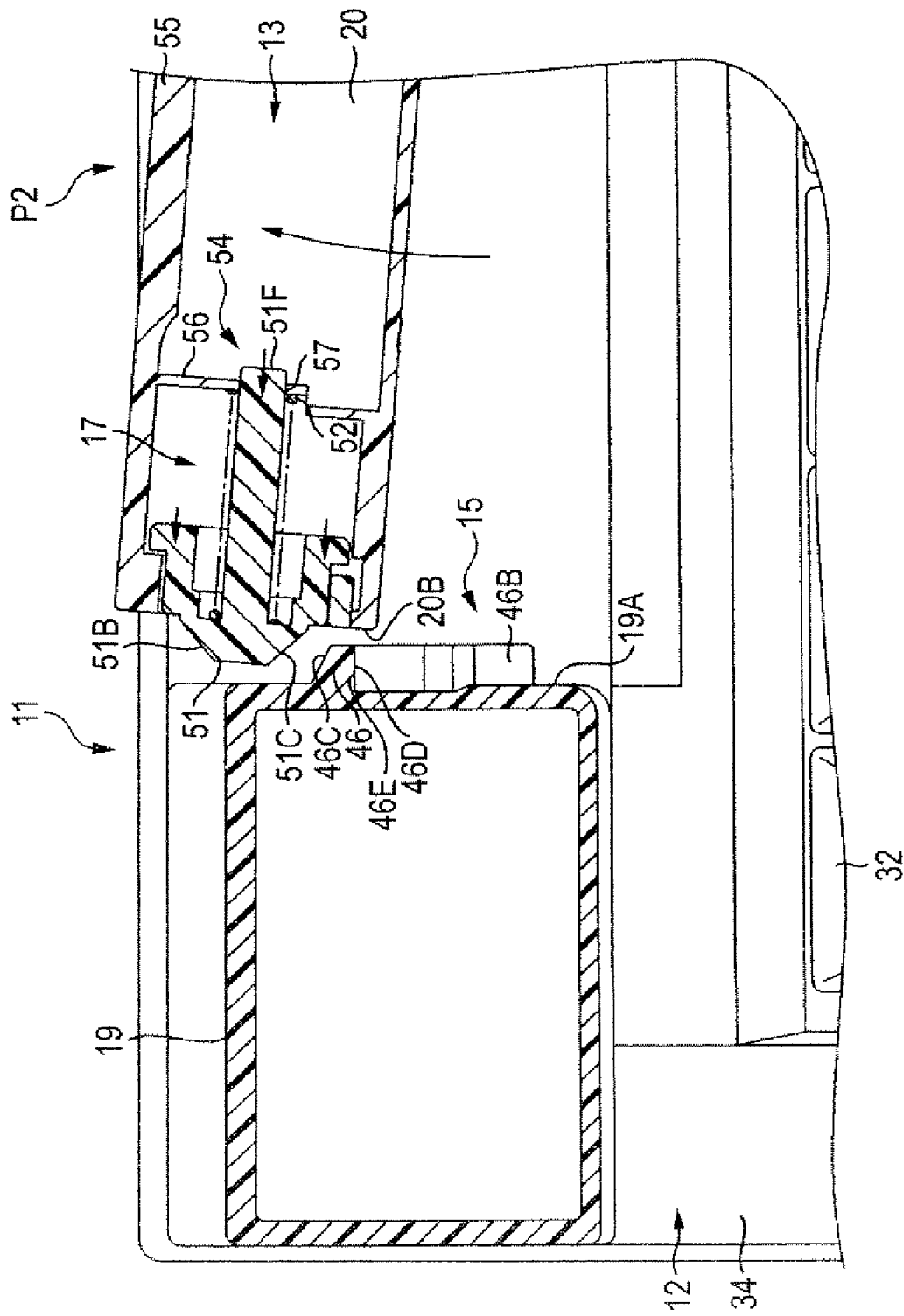
FIG. 19 is an exemplary sectional view to show a state after the moving projection shown in FIG. 17 climbs over the second engaging part.

If the user sets the display section 13 from the closed state P1 shown in FIG. 2 to the open state P2 shown in FIG. 1, the first tapered face 51B of the moving projection 51 is opposed to the second engaging part 46 as shown in FIG. 17. Accordingly, it is made possible to pivot the display section 13. In this state, if the user holds the right end part of the display section 13, for example, and pivots the display section 13 toward the user, the first tapered face 51B of the moving projection 51 of the lock mechanism 17 abuts the wall part 46E of the second engaging part 46. If the user continues to pivot the display section 13, the first tapered face 51B slides along the wall part 46E of the second engaging part 46. Accordingly, a part of the force applied in the direction of pivoting the display section 13 is converted into a force applied in the direction of compressing the spring member 52 by the first tapered face 51B. Thus, the moving projection 51 is retreated in the direction of the leg part 20 as shown in FIG. 18 and the moving projection 51 can climb over the second engaging part 46 as shown in FIG. 19.

Figure 20:
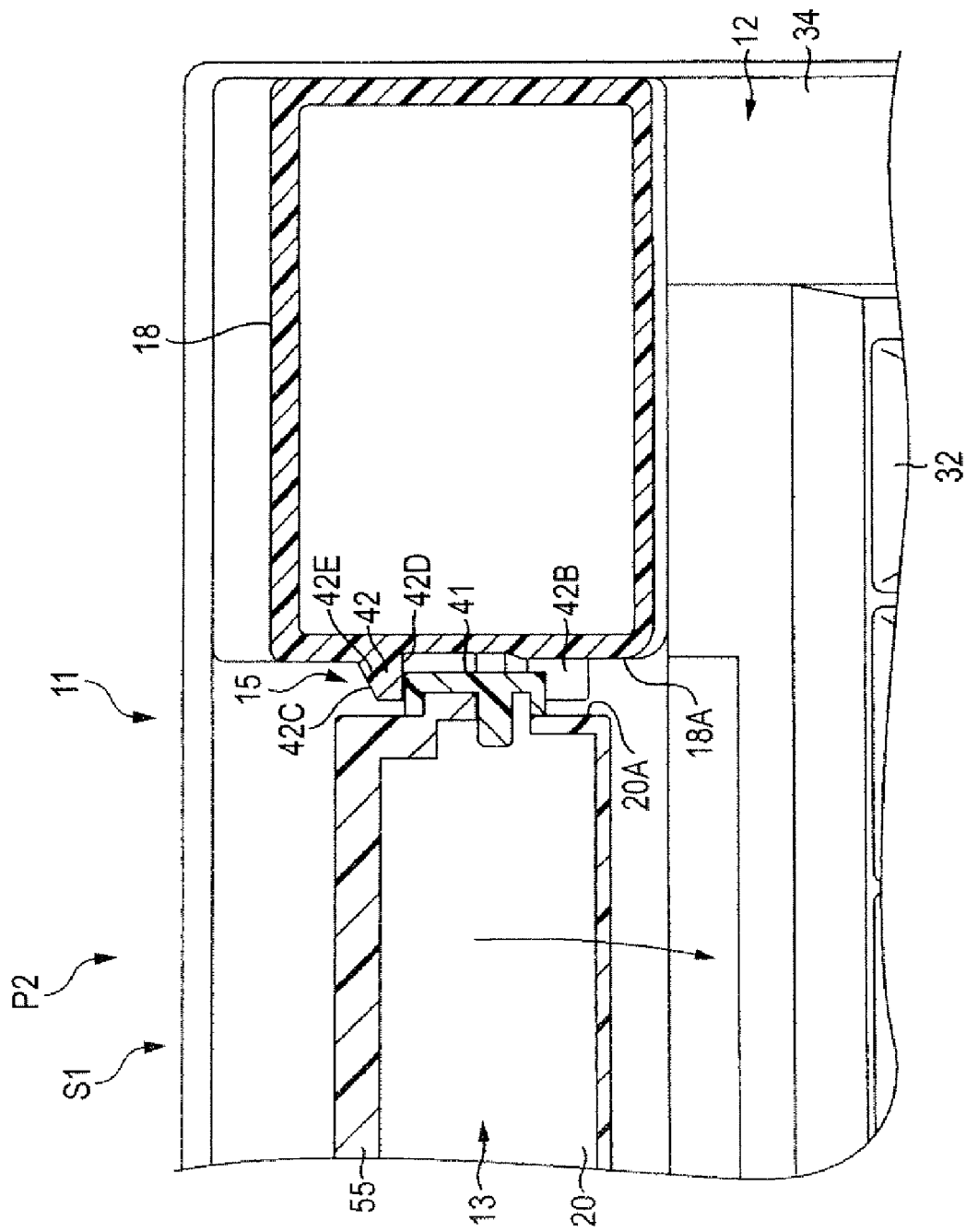
FIG. 20 is an exemplary sectional view to show the first pivot regulation mechanism shown in FIG. 4 cut in the horizontal direction with the display section set in the open state.
Figure 21:
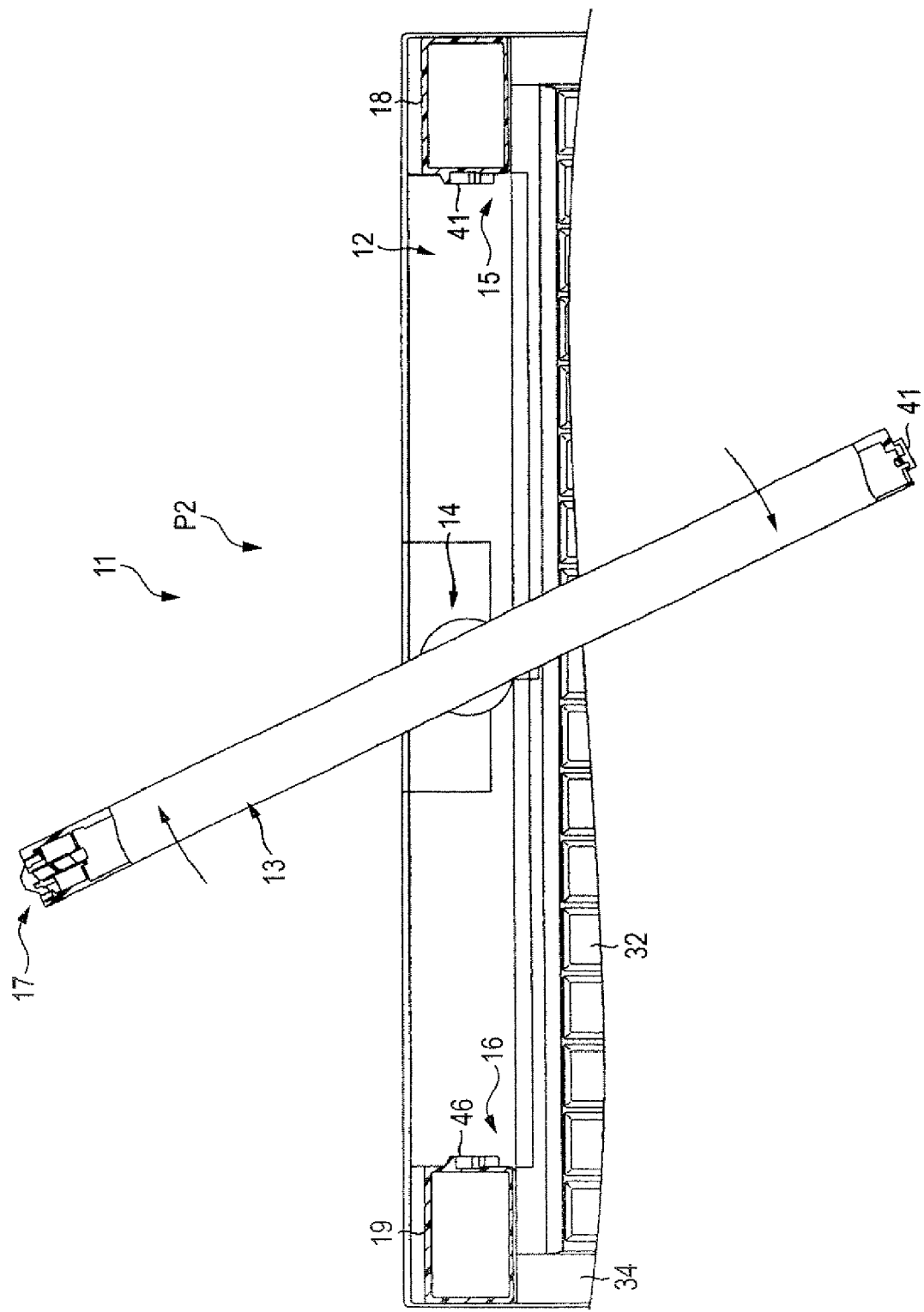
FIG. 21 is an exemplary sectional view to show a state in which the display section of the portable computer shown in FIG. 1 is pivoting from a first state to a second state.

On the other hand, the fix projection 41 of the first pivot regulation mechanism 15 abuts the first engaging part 42 as shown in FIG. 20 when the display section 13 is in the first state S1 shown in FIG. 1. Thus, the fix projection 41 cannot pivot in the rear direction of the portable computer 11 and accordingly the pivot direction of the display section 13 is regulated to one direction. The fix projection 41 is pivoted in the front direction of the portable computer 11 at the same time as the moving projection 51 of the lock mechanism 17 climbs over the second engaging part 46, as shown in FIG. 20. The display section 13 is pivoted clockwise on the hinge mechanism 14, as shown in FIG. 21.

Figure 22:
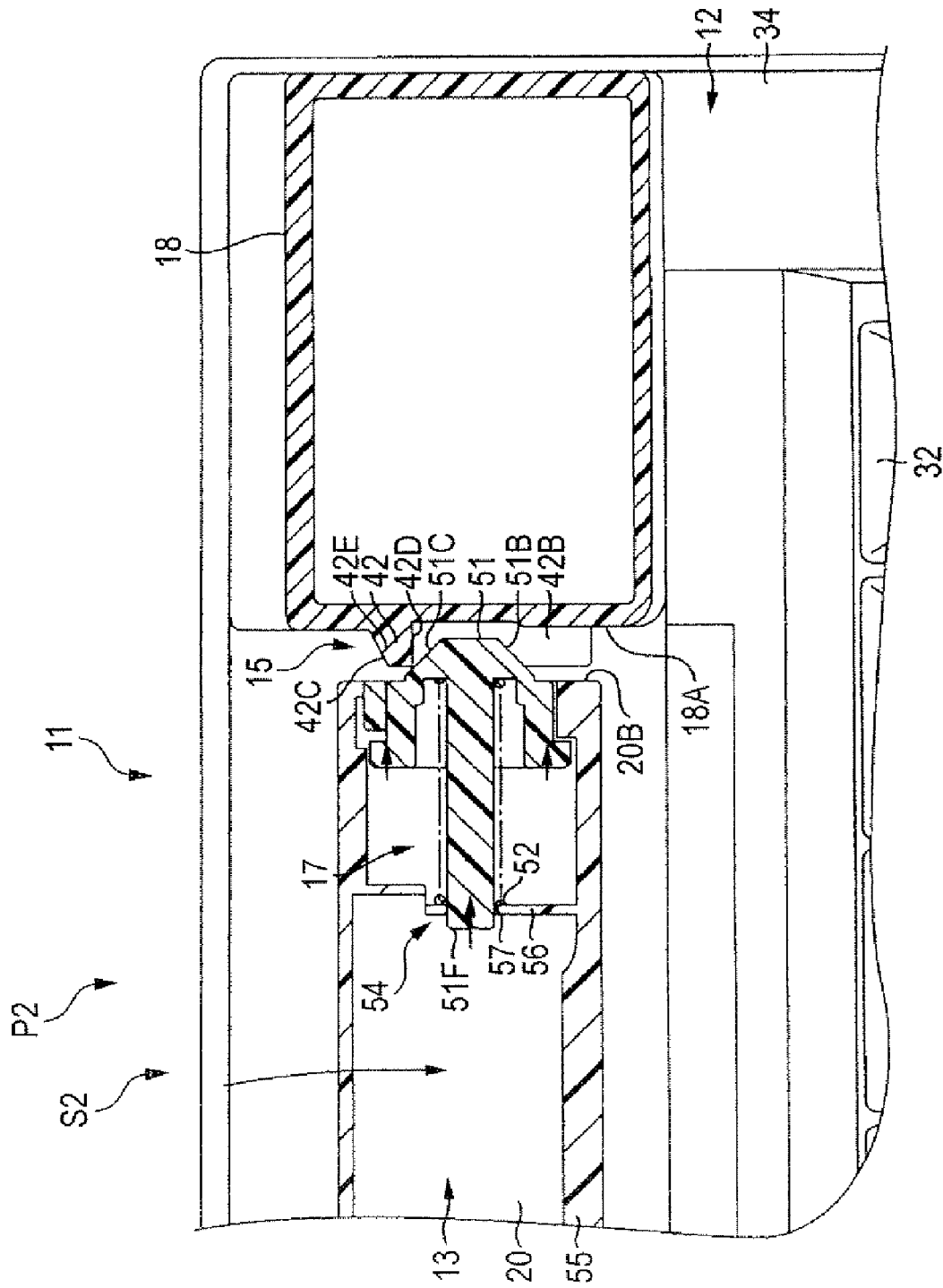
FIG. 22 is an exemplary sectional view to show a state in which the moving projection shown in FIG. 19 is fitted into the first engaging part.
Figure 23:
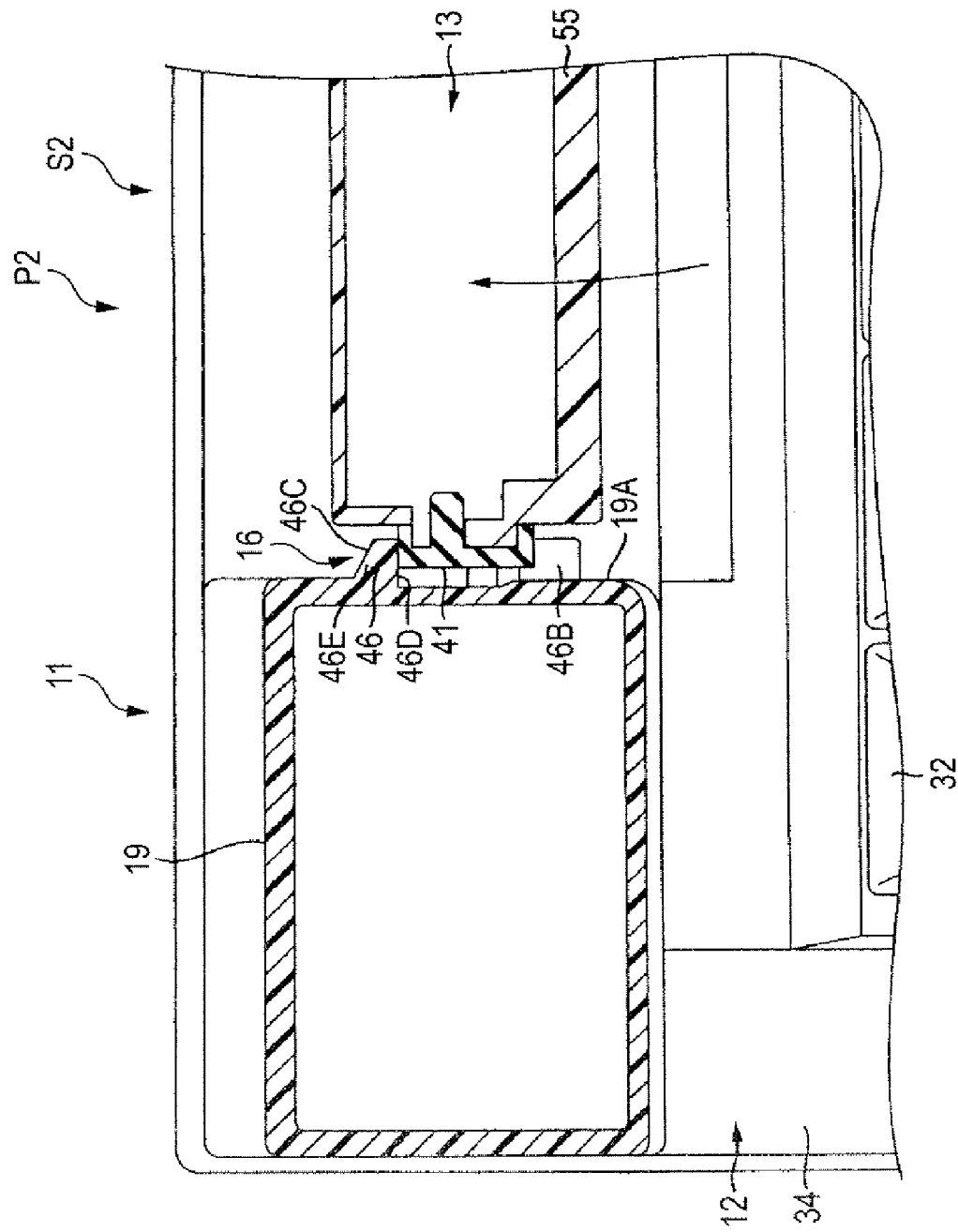
FIG. 23 is an exemplary sectional view to show a state in which a fix projection of the first pivot regulation mechanism shown in FIG. 20 is fitted into the second engaging part.
Figure 24:
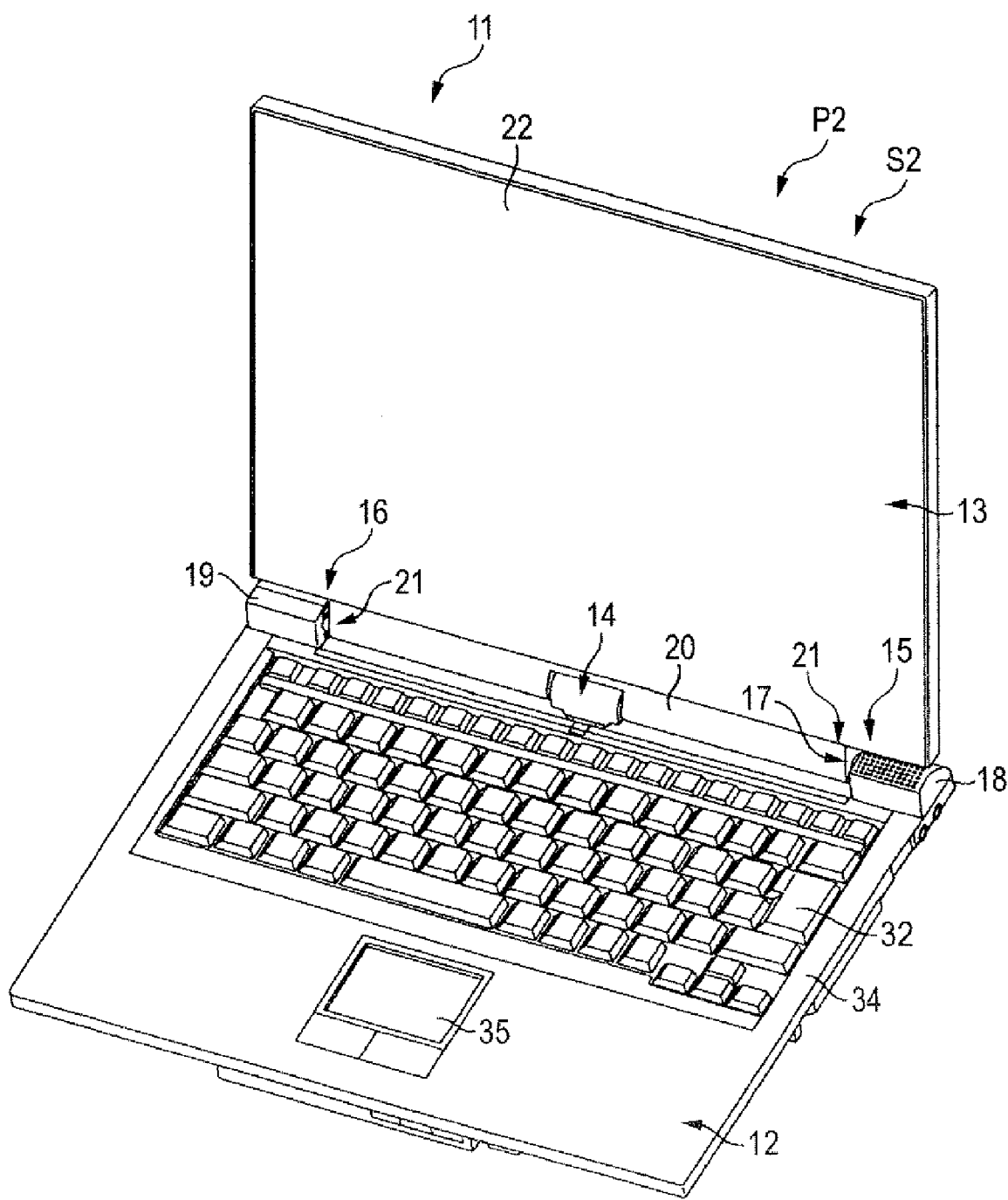
FIG. 24 is an exemplary perspective view to show the second state of the display section of the portable computer shown in FIG. 1 in the open state.
Figure 25:
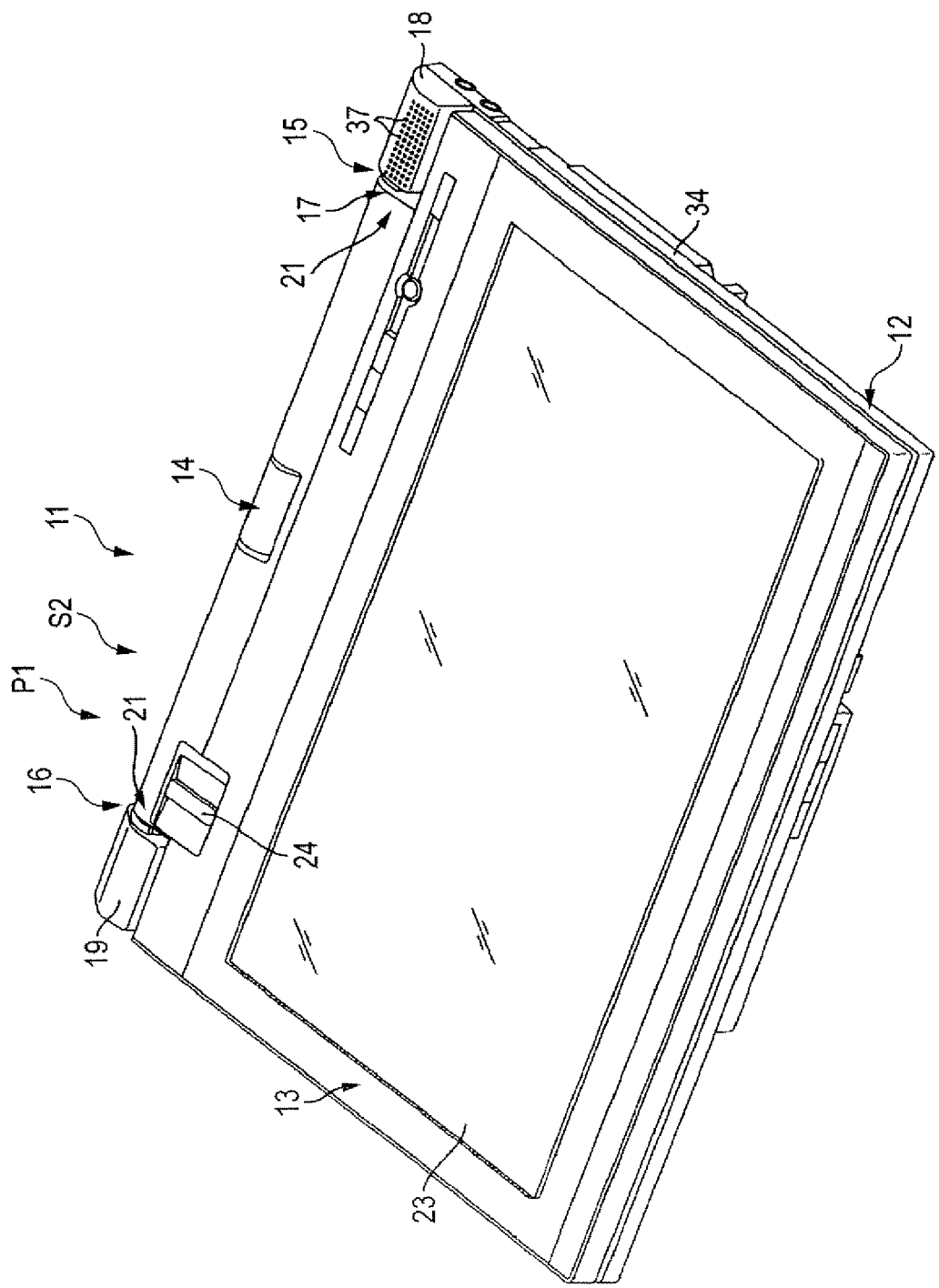
FIG. 25 is an exemplary perspective view to show the display section in the second state shown in FIG. 24 in the closed state.

When the moving projection 51 of the lock mechanism 17 approaches the first engaging part 42, the first tapered face 51B slides along the outer peripheral portion 42C and the wall part 42E of the first engaging part 42, thereby retreating the moving projection 51 in the direction of the leg part 20. Thus, the moving projection 51 climbs over the first engaging part 42 and is fitted so as to be engaged to the inside of the first engaging part 42, as shown in FIG. 22. On the other hand, the fix projection 41 abuts the second engaging part 46 and is fitted so as to be engaged to the inside of the second engaging part 46, as shown in FIG. 23. Pivoting of the display section 13 from the first state S1 to the second state S2 is now complete, and the display section 13 is set in a state as shown in FIG. 24. Thus, when the display section 13 is pivoted from the first state S1 to the second state S2, the moving projection 51 as the second projection climbs over the wall part 46E of the second engaging part 46 and engaging of the moving projection 51 from the second engaging part 46 is released and the moving projection 51 climbs over the wall part 42E of the first engaging part 42 and is engaged to the first engaging part 42. Further to use the input pen (not shown), for example, the user rotates the display section 13 so as to cover the main body 12, as shown in FIG. 25.

On the other hand, when the display section 13 is pivoted and restored to the first state S1 shown in FIG. 1 from the second state S2 shown in FIG. 24, a similar operation process is executed in the reverse direction. That is, the second tapered face 51C of the moving projection 51 slides along the wall part 42E of the first engaging part 42 and the outer peripheral portion 46C and the wall part 46E of the second engaging part 46, whereby the moving projection 51 is retreated in the direction of the leg part 20 and climbs over them. Thus, the moving projection 51 is fitted so as to be engaged to the inside of the second engaging part 46.

According to the embodiment, the first pivot regulation mechanism 15 can define the direction of pivoting the display section 13. The second pivot regulation mechanism 16 can define the angles at which the display section 13 can be pivoted. The first pivot regulation mechanism 15 and the second pivot regulation mechanism 16 are provided on the extension of the rotation shaft 27 and thus can be placed at sufficiently distant positions from the hinge mechanism 14. Accordingly, when the display section 13 is pivoted, applying a large force to the first pivot regulation mechanism 15 and the second pivot regulation mechanism 16 according to the principles of a lever is prevented and breakage of the first pivot regulation mechanism 15 and the second pivot regulation mechanism 16 is prevented.

If the display section 13 shifts relative to the main body 12 in the closed state P1, the display section 13 can be collide with the first convex part 18 or the second convex part 19. The lock mechanism 17 prevents the display section 13 from the shifting and the colliding, by blocking the display section 13 from the pivoting in the closed state P1.

The first pivot regulation mechanism 15 is provided between the display section 13 and the first convex part 18. Thus, the first pivot regulation mechanism 15 can be placed at a position that can be seen by the user and the user can easily find out breakage of the first pivot regulation mechanism 15. If the user breaks the first pivot regulation mechanism 15, the user can observe the breakage situation and thus the attention of the user can be attracted.

The first pivot regulation mechanism 15 includes the fix projection 41 shaped like a circular cylinder and the first engaging part 42 formed like a horseshoe shape, and the opening 42A of the first engaging part 42 is placed in the direction of pivoting the fix projection 41. Thus, the first pivot regulation mechanism 15 can be formed as a simple structure.

The fix projection 41 rotates with rotation of the display section 13 in a state in which it is fitted into the first engaging part 42. The first engaging part 42 also serves as a bearing for the fix projection 41 thus rotating. Accordingly, in addition to the hinge mechanism 14, a structure for supporting rotation of the display section 13 can be provided at a distant position from the hinge mechanism 14. Accordingly, when the display section 13 is rotated between the open state P2 and the closed state P1, the display section 13 can be prevented from shaking.

The first engaging part 42 of the first pivot regulation mechanism 15 has the first removal prevention part 44 that blocks removal of the fix projection 41 from the first engaging part 42 when the display section 13 pivots. Thus, when the display section 13 is rotated between the open state P2 and the closed state P1, the fix projection 41 can be prevented from becoming dislodged from the first engaging part 42.

The first engaging part 42 includes the pair of end parts 42B that defines the surrounding of the opening 42A and at least one end part 42B of the pair of end parts 42B has a taper shape gradually decreasing in size to a tip. Thus, when the display section 13 is pivoted from the second state S2 to the first state S1, the fix projection 41 can be guided gradually to a predetermined position inside the first engaging part 42. Usually, often a distant position from the hinge mechanism 14 of the display section 13 is bent downward under its own weight. Thus, if particularly the lower end part 42B is shaped gradually decreasing in size to a tip, the distant position from the hinge mechanism 14 of the display section 13 can be lifted up for guiding the fix projection 41 to the inside of the first engaging part 42.

The second pivot regulation mechanism 16 is provided between the display section 13 and the second convex part 19. Accordingly, the second pivot regulation mechanism 16 can be placed at a position that can be seen by the user like the first pivot regulation mechanism 15.

The second pivot regulation mechanism 16 includes the fix projection 41 and the second engaging part 46 formed like a horseshoe shape, and has the opening 46A in the direction of receiving the fix projection 41 pivoted together with the display section 13. Thus, the fix projection 41 can be shared with the first pivot regulation mechanism 15 and the number of parts can be decreased. The second pivot regulation mechanism 16 can be formed as a simple structure.

The fix projection 41 rotates with rotation of the display section 13 in a state in which it is fitted into the second engaging part 46. The second engaging part 46 also serves as a bearing for the fix projection 41 thus rotating. Thus, in addition to the hinge mechanism 14, a structure for supporting rotation of the display section 13 can be included and the display section 13 can be effectively prevented from shaking at the rotating time.

The second engaging part 46 has the second removal prevention part 47 that blocks removal of the fix projection 41 from the second engaging part 46 when the display section 13 pivots. Thus, when the display section 13 is rotated between the open state P2 and the closed state P1, the fix projection 41 can be prevented from becoming dislodged from the second engaging part 46.

The second engaging part 46 includes the pair of end parts 46B that defines the surrounding of the opening 46A and at least one end part 46B of the pair of end parts 46B has a taper shape gradually decreasing in size to a tip. Thus, when the display section 13 is pivoted from the first state S1 to the second state S2, the fix projection 41 can be guided to a predetermined position inside the second engaging part 46.

The lock mechanism 17 is provided on the opposite side to the fix projection 41 with the center of the hinge mechanism 14 in the outer peripheral portion of the display section 13. When the display section 13 is in the first state S1, the lock mechanism 17 is engaged to the second engaging part 46 of the second pivot regulation mechanism 16 and when the display section 13 is in the second state S2, the lock mechanism 17 is engaged to the first engaging part 42 of the first pivot regulation mechanism 15. Accordingly, pivoting of the display section 13 can be blocked by both of the first engaging part 42 of the first pivot regulation mechanism 15 and the second engaging part 46 of the second pivot regulation mechanism 16.

The lock mechanism 17 has the moving projection 51 that can move in the axis α direction of the rotation shaft 27 and the spring member 52 that urges the moving projection 51 in the projecting direction. Thus, the lock mechanism 17 can be formed as a simple spring structure. When the spring member 52 is engaged to the first engaging part 42 and the second engaging part 46, a spring sound of "click" is produced, thus enabling the user to recognize that the moving projection 51 is engaged to the first engaging part 42 and the second engaging part 46.

The moving projection 51 has the circular arc part 51A shaped like a circular arc of the same diameter as the fix projection 41, the first tapered face 51B sliding along the first engaging part 42 and the second engaging part 46, thereby compressing the spring member 52, and the second tapered face 51C sliding along the first engaging part 42 and the second engaging part 46, thereby compressing the spring member 52. Accordingly, to release the lock mechanism 17, the display section 13 is pivoted a predetermined amount for releasing engaging of the moving projection 51 to the second engaging part 46, whereby the lock mechanism 17 can be released easily.

The moving projection 51 rotates with rotation of the display section 13 in a state in which it is fitted into the second engaging part 46. The second engaging part 46 also serves as a bearing for the moving projection 51. In addition, the moving projection 51 rotates with rotation of the display section 13 in a state in which it is fitted into the first engaging part 42. The first engaging part 42 also serves as a bearing for the moving projection 51. Accordingly, when the display section 13 is set from the open state P2 shown in FIG. 1 to the closed state P1 shown in FIG. 2 or when the display section 13 is set from the open state P2 shown in FIG. 24 to the closed state P1 shown in FIG. 25, the display section 13 can be prevented from shaking. The moving projection 51 is provided on the opposite side to the fix projection 41 with the center of the hinge mechanism 14. Therefore, one end of the display section 13 can be supported through the fix projection 41 as the first projection and an opposite end of the display section 13 can be supported through the moving projection 51 as the second projection.

The lock mechanism 17 has the rotation block mechanism 54 that blocks rotation of the moving projection 51, so that the moving projection 51 can be prevented from rotating freely. If rotating of the moving projection 51 is prevented, when the display section 13 is placed in the open state S2, the first tapered face 51B and the second tapered face 51C can be reliably opposed to the first engaging part 42 and the second engaging part 46. Accordingly, a defective condition such that the moving projection 51 cannot climb over the first engaging part 42 and cannot climb over the second engaging part 46 can be prevented.

The outer peripheral portion 42C of the first engaging part 42 and the outer peripheral portion 46C of the second engaging part 46 are shaped each like a taper. Thus, when the display section 13 is pivoted between the first state S1 and the second state S2, the moving projection 51 can easily climb over the first engaging part 42 and the second engaging part 46. Accordingly, the user can pivot the display section 13 by a light force.

The display section 13 has the fingerprint authentication device 24 in the proximity of the first pivot regulation mechanism 15. Usually, for fingerprint authentication, the user presses a thumb, etc., for example, against the fingerprint authentication device 24. Thus, if the fingerprint authentication device 24 is provided in the proximity of the first pivot regulation mechanism 15, even if the user pushes the fingerprint authentication device 24, the fix projection 41 of the first pivot regulation mechanism 15 is back supported by the first engaging part 42 formed like a horseshoe shape, so that the fingerprint authentication device 24 can be prevented from escaping in the rear direction. If the display section 13 is provided with the fingerprint authentication device 24, even if the display section 13 is in the second state S2 and the closed state P1 and the input pen is to be used, the fingerprint authentication device 24 can be faced to the outside so that it can function.

Subsequently, a second embodiment of an electronic apparatus will be discussed with reference to FIGS. 26A and 26B.

A portable computer 61 as an example of the electronic apparatus of the second embodiment differs from the portable computer of the first embodiment in orientation and positions of first engaging part 64 and second engaging part 65. Thus, parts different from those of the first embodiment will be mainly discussed and parts identical with or similar to those of the first embodiment are denoted by the same reference numerals in the second embodiment and will not be discussed again.

The portable computer 61 includes a first pivot regulation mechanism 62 having a first engaging part 64, a second pivot regulation mechanism 63 having a second engaging part 65, a lock mechanism, a display section, a hinge mechanism, an input pen, and a fingerprint authentication device.

Figure 26A:
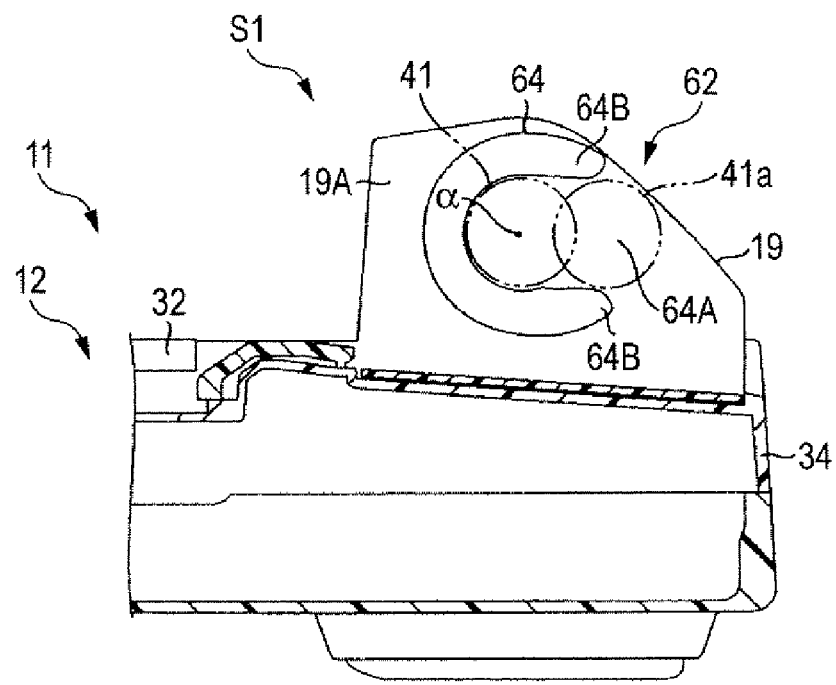
FIG. 26A is an exemplary sectional view to show a first pivot regulation mechanism of a portable computer according to a second embodiment of the invention.

The first engaging part 64 of the first pivot regulation mechanism 62 is formed like a horseshoe shape closed in the front direction of the portable computer 61 and is formed integral with a second convex part 19, as shown in FIG. 26A. The first engaging part 64 has an opening 64A placed in the direction of pivoting a fix projection 41 together with a display section 13. Also in the embodiment, the pivot direction of the display section 13 is inclined with respect to the horizontal direction. Thus, the first engaging part 64 has the opening 64A directed in a slanting downward direction.

The first engaging part 64 is similar to the first engaging part 42 in the first embodiment in that, of a pair of end parts 64B, at least one end part 64B placed in the lower part is shaped like a taper gradually decreasing in size to a tip. When the display section 13 is pivoted from a second state S2 to a first state S1, the end part 64B enables a pivoting fix projection 41*a* to be guided to a predetermined position, as shown in FIG. 26A. Of the pair of end parts 64B, the other end part 64B positioned in the upper part may be shaped like a taper gradually decreasing in size to a tip or both end parts 64B may be shaped like a taper.

Figure 26B:
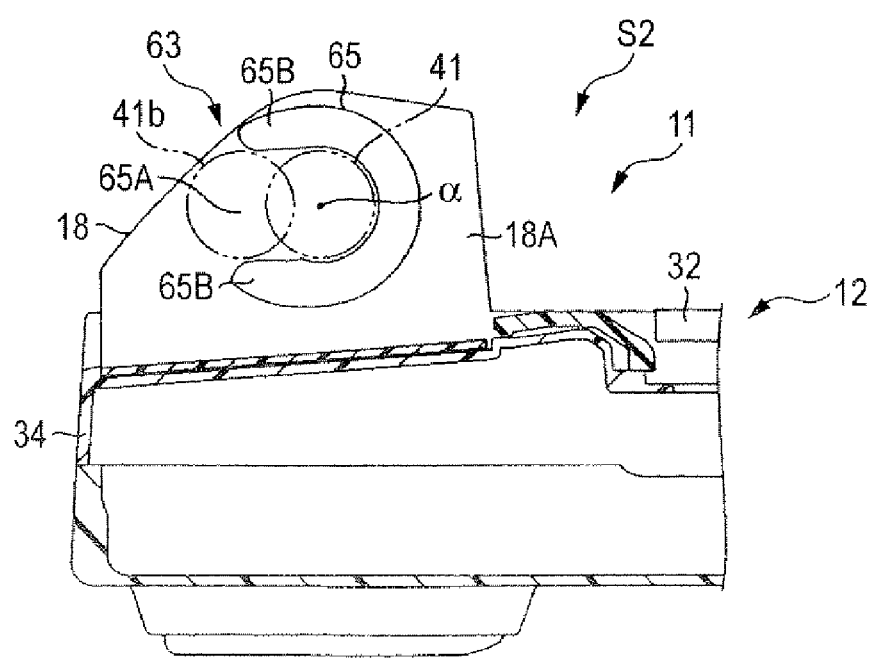
FIG. 26B is an exemplary sectional view to show a second pivot regulation mechanism of the portable computer according to the second embodiment of the invention.

The second engaging part 65 of the second pivot regulation mechanism 63 is formed like a horseshoe shape closed in the front direction of the portable computer 61 and is formed integral with a first convex part 18, as shown in FIG. 26B. The second engaging part 65 has an opening 65A placed in the direction of receiving the fix projection 41 pivoted together with the display section 13. In the embodiment, the pivot direction of the display section 13 is inclined with respect to the horizontal direction as mentioned above. Thus, the second engaging part 65 has the opening 65A directed in a slanting downward direction.

The second engaging part 65 has a pair of end parts 65B and at least the end part 65B placed in the lower part is shaped like a taper gradually decreasing in size to a tip. When the display section 13 is pivoted from the first state S1 to the second state S2, the end part 65B enables a pivoting fix projection 41*b* to be guided to a predetermined position. Of the pair of end parts 65B, the end part 65B positioned in the upper part may be shaped like a taper gradually decreasing in size to a tip.

The second embodiment of the portable computer 61 has been described. According to the second embodiment, if the first engaging part 64 and the second engaging part 65 have each the horseshoe shape closed in the opposite direction to that in the first embodiment, the first pivot regulation mechanism 62, the second pivot regulation mechanism 63, and the lock mechanism can be made to function. According to the second embodiment, the opening 64A of the first engaging part 64 and the opening 65A of the second engaging part 65 are directed downward, so that the fix projection 41 can be easily removed from them at the initial operation time of pivot and the user can start pivoting the display section by a light force.

Figure 27:
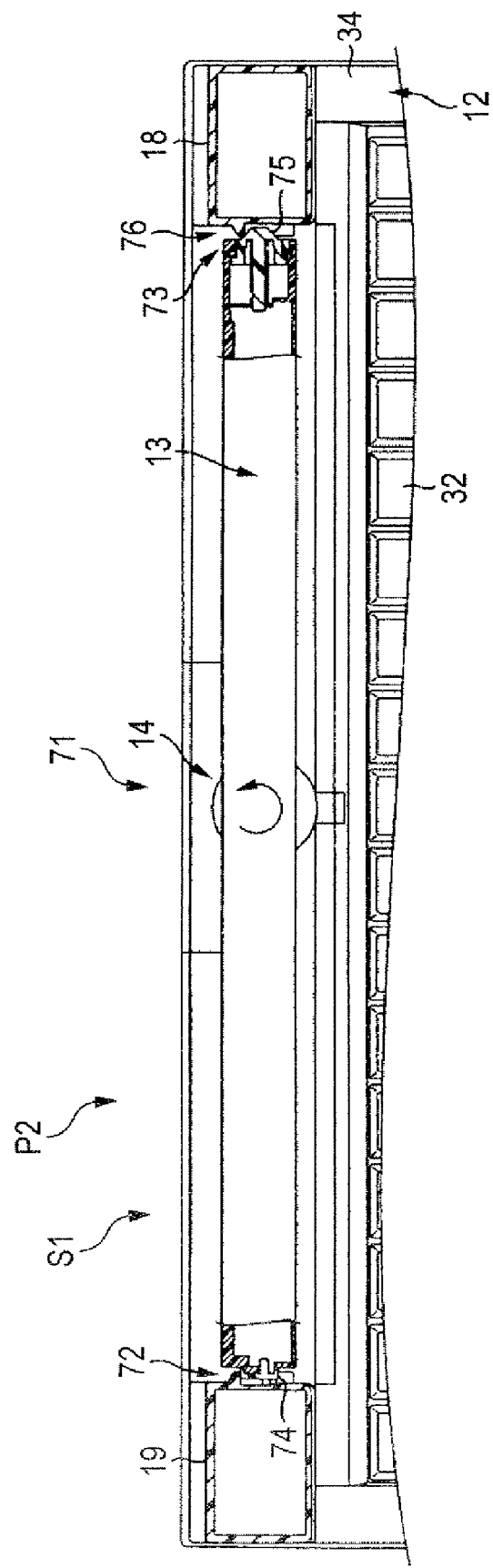
FIG. 27 is an exemplary sectional view to show a portable computer according to a third embodiment of the invention.

A third embodiment of a portable computer 71 as an example of an electronic apparatus will be discussed with reference to FIG. 27. The portable computer 71 of the third embodiment differs from the portable computer of the first embodiment in the position of a fix projection 74 of a first pivot regulation mechanism 72 and the position of a moving projection 75 of a lock mechanism 73. The position of the fix projection 74 of the first pivot regulation mechanism 72 and the position of the moving projection 75 of the lock mechanism 73 are exchanged. Thus, parts different from those of the first embodiment will be mainly discussed and parts identical with or similar to those of the first embodiment are denoted by the same reference numerals in the third embodiment and will not be discussed again.

The portable computer 71 of the third embodiment has the first pivot regulation mechanism 72 at the left and a second pivot regulation mechanism 76 and the lock mechanism 73 at the right. That is, the portable computer 71 of the third embodiment has specifications set for the left-handed user, for example; it enables the user to pivot a display section 13 counterclockwise from a first state S1 to a second state S2 with the user's left hand and enables the user to pivot the display section 13 clockwise from the second state S2 to the first state S1.

According to the third embodiment, the rotation direction and the rotation angle of the display section 13 can also be defined in a similar manner. Accordingly, the portable computer 71 pivoted in the opposite direction to that of the portable computer 11 of the first embodiment can be provided for the left-handed user, for example.

According to an aspect of the present invention, careless pivoting or rotation of the display section can be prevented and breakage of the hinge mechanism can be prevented.

The electronic apparatuses are not limited to the portable computers shown in the embodiments described above and the invention can also be embodied for other electronic apparatus such as a mobile information terminal, for example. The electronic apparatuses are not limited to those in the embodiments described above; for example, in contrast to the first embodiment, a fix projection and a moving projection are provided on a first convex part or a second convex part and a first engaging part and a second engaging part formed each like a horseshoe shape into which they are fitted can be provided in a leg part of a display section. According to the configuration, the effects similar to those of the embodiments described above can also be produced. In addition, various changes and modifications of the electronic apparatuses can be made without departing from the spirit and the scope of the invention, of course.

What is claimed is:

1. An electronic apparatus comprising:
 a main body comprising:
  a first convex portion that is disposed on an upper face of the main body and comprises a first engaging portion, and
  a second convex portion that is disposed on the upper face and spaced from the first convex portion and comprises a second engaging portion;
 a display unit comprising:
  a display surface,
  a rear surface disposed in an opposite side of the display surface, and
  a leg portion configured so as to be engaged with the first convex portion and the second convex portion;
 a hinge portion that joints the main body and the display unit, the hinge portion comprising:
  a rotation shaft rotatably supporting the display unit between a closed state in which the display unit covers the main body and an open state in which the display unit is risen relative to the main body, and
  a pivot shaft swingably supporting the display unit between a first state in which the display surface faces the upper face of the main body and a second state in which the rear surface faces the upper face; and
 a first projection projecting from the leg portion in an axial direction of the rotation shaft;
 wherein the first projection is engaged with the first engaging portion when the display unit is in the first state; and
 the first projection is engaged with the second engaging portion when the display unit is in the second state.

2. The electronic apparatus according to claim 1, wherein:
 the first engaging portion comprises a first engaging projection;
 the second engaging portion comprises a second engaging projection;
 the first engaging projection comprises a first opening;
 the second engaging projection comprises a second opening;
 the first opening guides the first projection when the display unit is swung toward the first state; and
 the second opening guides the first projection when the display unit is swung toward the second state.

3. The electronic apparatus according to claim 2, wherein each of the first opening and the second opening is opened toward a swinging direction of the display unit.

4. The electronic apparatus according to claim 3, wherein:
 the first engaging projection comprises a first wall;
 the second engaging projection comprises a second wall;
 the first wall is disposed in an opposite side in the swinging direction to the first opening;
 the second wall is disposed in an opposite side in the swinging direction to the second opening;
 the first projection abuts the first wall in the first state; and
 the first projection abuts the second wall in the second state.

5. The electronic apparatus according to claim 4, wherein:
 the leg portion comprises a second projection on an opposite side of the first projection, the second projection projecting from the leg portion in the axial direction of the rotation shaft;
 the second projection is engaged with the second engaging portion when the display unit is in the first state; and
 the second projection is engaged with the first engaging portion when the display unit is in the second state.

6. The electronic apparatus according to claim 5, wherein:
 the second projection is reciprocable in the axial direction of the rotation shaft:
 the second projection is released from an engagement with the second engaging projection by climbing over the second wall when the display unit is swung from the first state; and
 the second projection comes into the engagement with the first engaging projection by climbing over the first wall when the display unit is swung toward the second state.

7. The electronic apparatus according to claim 6, wherein the leg portion comprises a spring that urges the second engaging projection outward from the leg portion.

8. The electronic apparatus according to claim 5, wherein:
 the first projection comprises a cylindrical projection substantially formed cylindrical; and each of the first engaging projection and the second engaging projection comprises a cylindrical hollow formed to substantially fit the cylindrical projection.

9. The electronic apparatus according to claim 8, wherein the second projection comprises:
 a circular arc part that is shaped in substantially a circular arc of the same diameter as the first projection, abuts the first wall or the second wall to regulate a swing motion of the display unit in the closed state;
 a first tapered face that abuts the second wall and retreats the second projection inward for the leg portion when the display unit in the open state is swung from the first state and toward the second state; and
 a second tapered face that abuts the first wall and retreats the second projection inward for the leg portion when the display unit in the open state is swung from the second state and toward the first state.

10. The electronic apparatus according to claim 9, wherein:
 the first engaging portion functions as a bearing of the second projection when the display unit rotates on the rotation shaft in the second state; and
 the second engaging portion functions as a bearing of the second projection when the display unit rotates on the rotation shaft in the first state.

11. The electronic apparatus according to claim 10, wherein each of the first projection and the second projection has a tapered outer peripheral portion.

* * * * *